United States Patent
Nagata et al.

(10) Patent No.: US 11,461,575 B2
(45) Date of Patent: Oct. 4, 2022

(54) OPTICAL INFORMATION READER, OPTICAL INFORMATION READER SYSTEM, AND ERROR CAUSE ANALYSIS METHOD

(71) Applicant: Keyence Corporation, Osaka (JP)

(72) Inventors: Hidezumi Nagata, Osaka (JP); Takashi Hirano, Osaka (JP); Kazuteru Yamamura, Osaka (JP)

(73) Assignee: KEYENCE CORPORATION, Osaka (JP)

(*) Notice: Subject to any disclaimer, the term of this patent is extended or adjusted under 35 U.S.C. 154(b) by 0 days.

(21) Appl. No.: 17/180,901

(22) Filed: Feb. 22, 2021

(65) Prior Publication Data
US 2021/0295002 A1 Sep. 23, 2021

(30) Foreign Application Priority Data
Mar. 19, 2020 (JP) .............................. JP2020-050011

(51) Int. Cl.
*G06K 7/14* (2006.01)
(52) U.S. Cl.
CPC .......... *G06K 7/1473* (2013.01); *G06K 7/1408* (2013.01)
(58) Field of Classification Search
None
See application file for complete search history.

(56) References Cited

U.S. PATENT DOCUMENTS

2012/0153022 A1* 6/2012 Havens .............. G06K 7/10732
235/455

FOREIGN PATENT DOCUMENTS

JP 201264170 A 3/2012

OTHER PUBLICATIONS

U.S. Appl. No. 17/180,895, filed Feb. 22, 2021 (93 pages).
U.S. Appl. No. 17/180,896, filed Feb. 22, 2021 (89 pages).
U.S. Appl. No. 17/180,899, filed Feb. 22, 2021 (99 pages).

* cited by examiner

*Primary Examiner* — Thien M Le
*Assistant Examiner* — April A Taylor
(74) *Attorney, Agent, or Firm* — Kilyk & Bowersox, P.L.L.C.

(57) ABSTRACT

The optical information reader includes an imaging part configured to capture a plurality of images at predetermined timing until code reading results in success or a reading process times out, and an output part configured to output information on timing at which the optical information reader receives the trigger signal, success or failure information on code reading, and the plurality of images captured by the imaging part, and success or failure information representing whether the reading process performed by a decoder results in success or failure and the plurality of images captured in response to the trigger signal are associated with the trigger signal, and, with a list of reading results corresponding to a plurality of the trigger signals displayed on a display part.

11 Claims, 14 Drawing Sheets

| RESULT DATA LIST | | | | | | |
|---|---|---|---|---|---|---|
| Index | Date | Time | Timiming ID | Result ID | Result | Code Count |
| 1 | 2020/01/01 | 00:00:00 | 1 | 1 | OK | 1 |
| 2 | 2020/01/01 | 00:01:00 | 2 | 1 | OK | 1 |
| 3 | 2020/01/01 | 00:01:30 | 3 | 1 | NG | 0 |
| 4 | 2020/01/01 | 00:02:00 | 4 | 1 | OK | 1 |
| 5 | 2020/01/01 | 00:02:30 | 5 | 1 | NG | 0 |
| 6 | 2020/01/01 | 00:03:00 | 6 | 1 | OK | 1 |

115

FIG. 12
117
DETAILS OF RESULT DATA
| Index | Date | Time | Timiming ID | Result ID | Result | Code Count | Output data |
|---|---|---|---|---|---|---|---|
| 1 | 2020/01/01 | 00:01:30 | 3 | 1 | NG | 1 | 1234567 |
DETAILS
| # | Name | Symbology | Bank | Scan Count | Area Number | Read Data |
|---|---|---|---|---|---|---|
| 1 | READER1 | Code 128 | 1 | 10 | 0 | 1234567 |
READER
⋮
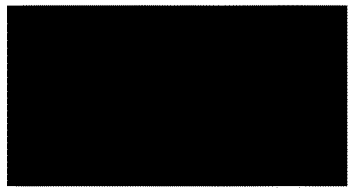
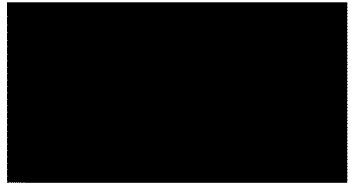

PLC MAP (PLC LINK)

CONTROL REGION

| ADDRESS | DETAILS | VALUE | ADDRESS | DETAILS |
|---|---|---|---|---|
| 100 | PLC TIMING AREA | 0 | 0 | BANK NUMBER/BLOAD FILE NUMBER |
| 101 | DATA WRITING PROCESS TYPE | 0 | 1 | ID INSTRUCTION |
| 102 | SEQUENCE PROCESS DATA WRITING PROCESS TYPE | 0 | 2 | NUMBER OF DIGITS OF OUTPUT DATA |
| 103 | BLOAD REQUEST | 0 | 3 | NUMBER OF TIMES OF DATA WRITING PROCESS |
| 104 | BLOAD COMPLETION CLEAR | 0 | | |

RESPONSE REGION

| ADDRESS | DETAILS | VALUE |
|---|---|---|
| 100 | PLC TIMING INPUT RESPONSE AREA | 0 |
| 101 | RESERVED AREA | 0 |
| 102 | SEQUENCE PROCESS DATA WRITING REQUEST | 0 |
| 103 | SEQUENCE PROCESS DATA WRITING COMPLETION | 0 |
| 104 | REAL TIME PROCESS DATA | 0 |
| 105 | BLOAD RESPONSE | 0 |

[CLOSE]

COMMAND LOG MONITOR

| No | Time | Type | Data |
|---|---|---|---|
| 16 | 2020/01/01 00:00:00:405 | Response | OK... |
| 17 | 2020/01/01 00:00:00:409 | Command | STRT |
| 18 | 2020/01/01 00:00:00:409 | Response | OK |
| 19 | 2020/01/01 00:00:00:413 | Command | RLOCK |
| 20 | 2020/01/01 00:00:00:561 | Response | OK |
| 21 | 2020/01/01 00:00:00:289 | Command | TEST |
| 22 | 2020/01/01 00:00:00:289 | Response | OK |
| 23 | 2020/01/01 00:00:30:596 | Command | EVENTLOG |
| 24 | 2020/01/01 00:00:30:597 | Response | OK |

OPTICAL INFORMATION READER, OPTICAL INFORMATION READER SYSTEM, AND ERROR CAUSE ANALYSIS METHOD

CROSS-REFERENCE TO RELATED APPLICATIONS

The present application claims foreign priority based on Japanese Patent Application No. 2020-050011, filed Mar. 19, 2020, the contents of which are incorporated herein by reference.

BACKGROUND OF THE INVENTION

1. Field of the Invention

The present invention relates to an optical information reader, an optical information reading method, an optical information reading program, a non-transitory computer-readable recording medium, and a recording device.

2. Description of Related Art

An optical information reader also called a code reader is known, the optical information reader being configured to receive light from a mark (hereinafter referred to as a "code") called a code such as a barcode or a QR code, a symbol, or the like to be read to acquire image data of the symbol using an imaging module, and to analyze the image data to read information based on the code. For example, in the distribution industry, a stationary code reader is used, the stationary code reader being configured to read, while various transfer objects are being transferred by a conveyor, a code attached to each transfer object. Such a stationary code reader irradiates a transfer object transferred on the conveyor with illumination light from a distant position, captures images of the transfer object with a camera, searches for a code from the images thus captured, and decodes the code (For example, JP 2012-064170 A).

When an error or trouble occurs in a system using such an optical information reader, it is required to promptly solve the trouble. In particular, for a distribution field such as a distribution warehouse, a quick delivery such as a delivery on the same day is demanded, so that immediate recovery is required, and the cause of the error needs to be identified for the immediate recover.

However, it is not easy to identify the cause of the error. There are various causes of the error, and even when the optical information reader itself has no problem, an error may occur. However, at present, an error signal is issued as a result of simply not being able to continue the operation without identifying the cause of an error, so that errors tend to be collectively regarded as errors indicating failure in reading. For this reason, it tends to be thought that the responsibility lies in the optical information reader, but in reality, the cause of an error does not lie in the optical information reader in many cases, which causes wasteful work.

There is a demand for a system capable of identifying where the cause of an error lies, but at present, such an optical information reading system has not been available.

SUMMARY OF THE INVENTION

An object of the present invention is to provide an optical information reader, an optical information reading method, an optical information reading program, a non-transitory computer-readable recording medium, and a recording device that facilitate, when an error occurs in the optical information reader, identification of the cause of the error.

An optical information reading system according to one embodiment of the present invention may include an optical information reader configured to read a code attached to an object to be scanned, a display part, and a management device connected to the optical information reader and the display part and configured to cause the display part to display information on the optical information reader. The optical information reader may include a trigger input part configured to receive a trigger signal from outside, a decoder configured to perform a reading process on the code, an imaging part disposed to be able to read the code and configured to capture, each time the trigger input part receives the trigger signal, a plurality of images at predetermined timing until the decoder succeeds in reading the code or the reading process times out, and an output part configured to output, to the management device, information on timing at which the optical information reader receives the trigger signal, success or failure information on code reading, and the plurality of images captured by the imaging part. The success or failure information representing whether the reading process performed by the decoder results in success or failure and the plurality of images captured in response to the trigger signal may be associated with the trigger signal, and, with a list of reading results corresponding to a plurality of the trigger signals displayed on the display part, when the management device selects a reading result corresponding to any trigger signal, at least one of a plurality of images associated with the trigger signal selected may be allowed to be displayed on the display part. This configuration allows, when any problem occurs in the optical information reading system, the work of identifying the cause to be easily performed. Specifically, this configuration allows a corresponding image to be easily found using a trigger as a starting point to contribute to the identification of the cause of the problem.

In the optical information reading system according to another embodiment of the present invention, in addition to the above-described configuration, the management device may further include, in the display part, a display controller configured to cause the display part to simultaneously or switchably display a first screen configured to display a timing chart in which a plurality of pieces of the information on timing collected from the optical information reader are displayed on a common time axis, and a second screen configured to display both the success or failure information on code reading and the image collected from the optical information reader.

In the optical information reading system according to still another embodiment of the present invention, in addition to any one of the above-described configurations, the management device may further include a trigger selection part configured to select, with the timing chart displayed on the first screen of the display part, a reading result corresponding to any trigger signal on the timing chart. When the trigger selection part selects a reading result corresponding to any trigger signal, at least one of a plurality of images associated with the trigger signal may be displayed on the display part. This configuration makes it possible to easily call an image associated with a trigger signal selected from the plurality of trigger signals displayed on the timing chart in chronological order. For example, when a trouble occurs in the optical information reading system, a trigger signal recorded at around timing at which the trouble occurs and associated with success or failure information representing failure in reading is selected, and then an image associated with the trigger signal is called, thereby allowing a situation when the trouble occurs to be checked.

In the optical information reading system according to still another embodiment of the present invention, in addition to any one of the above-described configurations, a jump from the first screen displayed on the display part to the second screen may be allowed.

In the optical information reading system according to still another embodiment of the present invention, in addition to any one of the above-described configurations, an image displayed on the display part may be a moving image.

In the optical information reading system according to still another embodiment of the present invention, in addition to any one of the above-described configurations, the optical information reader may cause, when the decoder performs the reading process on the code, the output part to output information containing status information on the optical information reader, and the management device may associate the trigger signal with the status information and cause the display part to display the trigger signal and the status information.

In the optical information reading system according to still another embodiment of the present invention, in addition to any one of the above-described configurations, the success or failure information on code reading representing failure in reading associated with the trigger signal may be extracted and displayed on the display part. This configuration makes it possible to present a display without a trigger associated with the success or failure information representing success in reading that is not required for identification of the cause when a problem occurs, allowing the work of identifying the cause to be smoothly performed.

In the optical information reading system according to still another embodiment of the present invention, in addition to any one of the above-described configurations, the object to be scanned may be a transfer object that moves on a transfer line.

An optical information reader according to one embodiment of the present invention is configured to read a code attached to an object to be scanned and may include a trigger input part configured to receive a trigger signal from outside, a decoder configured to perform a reading process on the code, an imaging part disposed to be able to read the code and configured to capture, each time the trigger input part receives the trigger signal from outside, a plurality of images at predetermined timing until the decoder succeeds in reading the code or the reading process times out, and an output part configured to output, to an external management device, information on timing at which the optical information reader receives the trigger signal, success or failure information on code reading, and the plurality of images captured by the imaging part. The success or failure information representing whether the reading process performed by the decoder results in success or failure and the plurality of images captured in response to the trigger signal may be associated with the trigger signal and be allowed to be displayed on an external display part. This configuration allows, when any problem occurs in the optical information reading system, the work of identifying the cause to be easily performed. Specifically, this configuration allows a corresponding image to be easily found using a trigger as a starting point to contribute to the identification of the cause of the problem.

An optical information reading method according to one embodiment of the present invention using an optical information reading system including an optical information reader configured to read a code attached to an object to be scanned, and a management device connected to the optical information reader and configured to cause a display part to display information on the optical information reader may include causing the optical information reader to receive a trigger signal from outside, capturing, each time the trigger signal is received, a plurality of images at predetermined timing until a decoder performs a reading process on the code, and the decoder succeeds in reading the code or the reading process times out, outputting, to the management device, information on timing at which the optical information reader receives the trigger signal, success or failure information on code reading, and the plurality of images captured by the imaging part, and causing the management device to record the success or failure information representing whether the reading process performed by the decoder results in success or failure and the plurality of images captured in response to the trigger signal with the success or failure information and the plurality of images associated with the trigger signal input from the optical information reader. This configuration allows, when any problem occurs in the optical information reading system, the work of identifying the cause to be easily performed. Specifically, this configuration allows a corresponding image to be easily found using a trigger as a starting point to contribute to the identification of the cause of the problem.

An error cause analysis method according to one embodiment of the present invention for analyzing a cause when an error occurs in an optical information reading system including an optical information reader configured to read a code attached to an object to be scanned, a display part, and a management device connected to the optical information reader and the display part and configured to cause the display part to display information on the optical information reader may include causing the optical information reader to receive a trigger signal from outside, capturing, each time the trigger signal is received, a plurality of images at predetermined timing until a decoder performs a reading process on the code, and the decoder succeeds in reading the code or the reading process times out, outputting, to the management device, information on timing at which the optical information reader receives the trigger signal, success or failure information on code reading, and the plurality of images captured by the imaging part, causing the management device to record the success or failure information representing whether the reading process performed by the decoder results in success or failure and the plurality of images captured in response to the trigger signal with the the success or failure information and the plurality of images associated with the trigger signal input from the optical information reader, selecting, with a list of reading results corresponding to a plurality of the trigger signals displayed on the display part, a reading result corresponding to any trigger signal, and causing the display part to display at least one of a plurality of images associated with the trigger signal selected. This configuration allows, when any problem occurs in the optical information reading system, the work of identifying the cause to be easily performed. Specifically, this configuration allows a corresponding image to be easily found using a trigger as a starting point to contribute to the identification of the cause of the problem.

The error cause analysis method according to another embodiment of the present invention may further include identifying, with an image displayed on the display part, the cause of the error that occurs in the optical information reading system from a trouble related to data input and output between an external device and the optical information reader, a trouble related to data communication between the external device and the optical information reader, and a trouble related to code reading by the optical information reader.

An optical information reading system management program according to one embodiment of the present invention for analyzing a cause when an error occurs in an optical information reading system including an optical information reader configured to read a code attached to an object to be scanned, a display part, and a management device connected to the optical information reader and the display part and configured to cause the display part to display information on the optical information reader may cause a computer to perform a function of causing the management device to record, when the optical information reader captures, each time the trigger signal is received from outside, a plurality of images at predetermined timing until the decoder performs the reading process on the code, and the decoder succeeds in reading the code or the reading process times out and outputs, to the management device, information on timing at which the optical information reader receives the trigger signal, success and failure information on code reading, and the plurality of images captured by the imaging part, the success or failure information representing whether the reading process performed by the decoder results in success or failure and the plurality of images captured in response to the trigger signal with the success or failure information and the plurality of images associated with the trigger signal input from the optical information reader, and to cause the display part to display a list of reading results corresponding to a plurality of the trigger signals thus recorded, a function of causing the management device to select, with the list displayed, a reading result corresponding to any trigger signal, and a function of causing the management device to cause the display part to display at least one of a plurality of images associated with the trigger signal selected. This configuration allows, when any problem occurs in the optical information reading system, the work of identifying the cause to be easily performed. Specifically, this configuration allows a corresponding image to be easily found using a trigger as a starting point to contribute to the identification of the cause of the problem.

Furthermore, a non-transitory computer-readable recording medium or recording device according to one embodiment stores the above-described program. Examples of such a recording medium include a magnetic disk, an optical disc, a magneto-optical disk, a semiconductor memory, and other media capable of storing the program such as CD-ROM, CD-R, CD-RW, flexible disk, magnetic tape, MO, DVD-ROM, DVD-RAM, DVD-R, DVD+R, DVD-RW, DVD+RW, Blu-ray, HD DVD (AOD), and UHD (all are trade names). Further, examples of the program include a program stored in the above-described recording medium and distributed, and a program distributed by download over a network such as the Internet. Further, examples of the recording device include a general-purpose or dedicated device in which the above-described program is implemented in an executable form such as software or firmware. Furthermore, each process or function included in the program may be executed by computer-executable program software, and a process of each component may be implemented by hardware such as a predetermined gate array (FPGA, ASIC) or by a combination of program software and a partial hardware module that serves as a part of the hardware.

BRIEF DESCRIPTION OF THE DRAWINGS

FIG. 12 is an image diagram showing an example of an image list when reading results in failure;

FIG. 16 is a schematic diagram showing an example of a PLC map for use in confirming a PLC link communication status;

FIG. 17 is a schematic diagram showing an example of a command monitor screen;

DETAILED DESCRIPTION OF PREFERRED EMBODIMENTS

Figure 1:
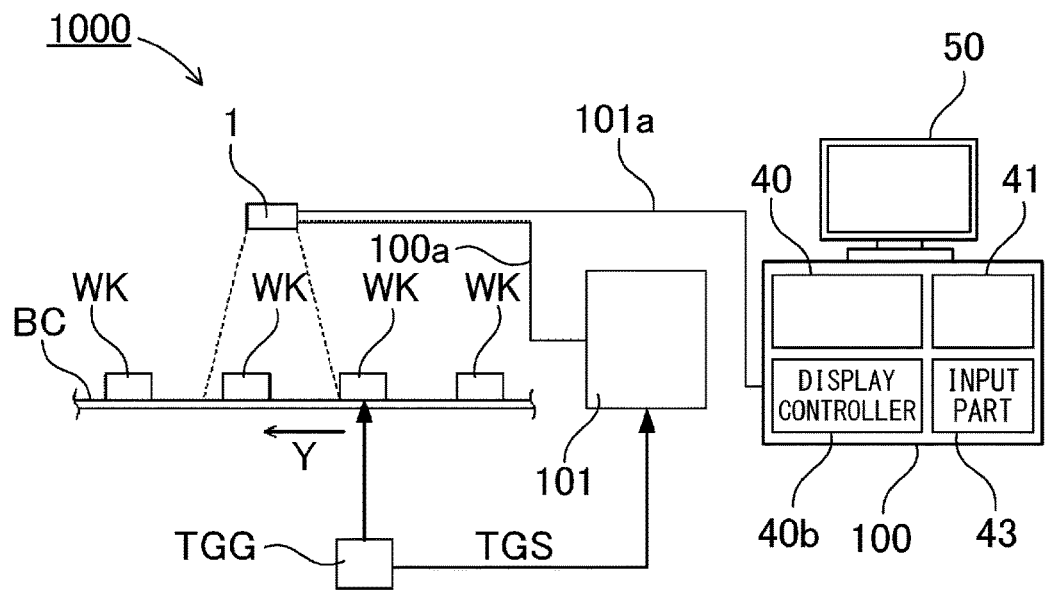
FIG. 1 is a schematic diagram showing a structure of an optical information reading system according to a first embodiment of the present invention.

Hereinafter, embodiments of the present invention will be described with reference to the drawings. Note that the following embodiments are intended to exemplify an optical information reader, an optical information reading method, an optical information reading program, a non-transitory computer-readable recording medium, and a recording device for embodying the technical idea of the present invention, and the present invention is not limited to the following optical information reader, optical information reading method, optical information reading program, non-transitory computer-readable recording medium, and recording device. Further, herein, the members shown in the claims are not limited at all to the members in the embodiments. In particular, dimensions, materials, shapes, relative positions, and the like of the components described in the embodiments are not intended to limit the scope of the present invention only to those unless otherwise specified, and are merely illustrative examples. Note that sizes, positional relationships, and the like of the members shown in each drawing may be exaggerated for purposes of clear illustration. Further, in the following description, the same names or reference numerals denote the same members or members that are the same in quality, and detailed description of such members will be omitted as needed. Further, each element making up the present invention may have an aspect such that a plurality of elements make up a single member, and the single member serves as the plurality of elements, or alternatively, the function of the single member may be implemented by the plurality of members.

First Embodiment

FIG. 1 shows a schematic diagram of an optical information reading system 1000 according to a first embodiment of the present invention. The optical information reading system 1000 reads a mark (hereinafter, collectively referred to as a "code") called a code such as a barcode or a two-dimensional code, or a symbol, and registers and collates data. The optical information reading system 1000 shown in FIG. 1 includes an optical information reader 1, a computer 100, a display part 50, a programmable logic controller (PLC) 101, a transfer belt conveyor BC, and a trigger generator TGG.

In this example, during operation, a plurality of workpieces WKs are transferred in a direction indicated by an arrow Y shown in FIG. 1 with the plurality of workpieces WKs placed on an upper surface of the transfer belt conveyor BC, and the optical information reader 1 according to the first embodiment is installed above and remote from the workpieces WKs. Each workpiece WK is, for example, a transfer object such as a package, and has a code such as a barcode or a two-dimensional code attached thereto. In the code, encoded information containing, for example, the name and destination of the package is recorded. Further, when the workpiece WK is a product, the product name, serial number, price, and the like, are recorded in the code for traceability.

The trigger generator TGG generates a trigger signal TGS that causes the optical information reader 1 to read the code. Examples of such a trigger generator TGG include a photoelectric sensor configured to detect that the workpiece WK transferred by the transfer belt conveyor BC has reached a predetermined position.

Upon detection of that the workpiece WK transferred in the Y direction by the transfer belt conveyor BC has reached the predetermined position, the trigger generator TGG generates the trigger signal TGS and transmits the trigger signal TGS to the PLC 101. Upon detection of the trigger signal TGS, the PLC 101 instructs the optical information reader 1 to perform a reading operation. In response to this instruction, the optical information reader 1 captures an image of the workpiece WK to which the code is attached and reads the information recorded in the code.

Note that the generation of the trigger signal that triggers the reading of a code is not necessarily limited to a configuration where the trigger signal is generated by hardware such as the trigger generator TGG. Examples of the generation of the trigger signal include an aspect where, for example, when preset conditions are met, the trigger signal is generated by software in the PLC 101 or the computer 100 and is transmitted to the optical information reader 1.

The optical information reader 1 is a code reader configured to capture the image of the code attached to the workpiece WK and to decode (perform a decoding process on) the code contained in the image thus captured to read the information. During its operation, the optical information reader 1 may be fixed to a bracket or the like so as to be prevented from moving, or alternatively, may be held and moved by a robot, a user, or the like. Further, the code of the workpiece WK that is stationary may be read by the optical information reader 1. "During its operation" corresponds to a time when the optical information reader 1 is in operation to sequentially read the codes of the workpieces WKs transferred by the transfer belt conveyor BC.

The code is attached to each workpiece WK. Examples of the code include a one-dimensional code such as a barcode or a two-dimensional code. Examples of the two-dimensional code include QR Code, micro QR Code, Data Matrix (Data Code), Veri Code, Aztec Code, PDF417, Maxi Code, and the like (all of them are trade names). Types of such two-dimensional codes include a stack type and a matrix type, and the present invention is applicable to both the types. The code may be attached by being directly printed or engraved on the workpiece WK, or alternatively, may be first printed on a label and then attached to the workpiece WK, and any mechanism or method for attaching the code is applicable.

The optical information reader 1 is connected to the computer 100 and the programmable logic controller (PLC) 101 by wire, that is, by signal lines 101*a* and 100*a*, respectively, but is not limited to such a structure, and the optical information reader 1, the computer 100, and the PLC 101 may each include a communication module and be connected to each other by radio. The PLC 101 is a control device configured to perform sequential control on the transfer belt conveyor BC, the trigger generator TGG, and the optical information reader 1, and a general-purpose PLC may be used as the PLC 101. Examples of the computer 100 include a general-purpose or dedicated electronic computer, a portable terminal, and the like.

In the example shown in FIG. 1, the computer 100 includes a CPU 40, a storage device 41, and a display controller 40*b*. Further, the computer 100 is connected to the display part 50 and an input part 43. The input part 43 is an input device for use in operating the computer 100, and a keyboard, a mouse, or the like may be used as the input part 43. The display controller 40*b* is a member configured to generate an image to be displayed on the display part 50.

The display part 50 is a display or a monitor, and a liquid crystal monitor, an organic EL display, a CRT, or the like may be used as the display part 50. Note that when a touch screen is used as the display part 50, the display part 50 can further serve as the input part 43. Further, the display part and the computer 100 may be integrated into a single unit, such as a tablet or slate PC, or a laptop PC.

(Computer 100)

Figure 2:
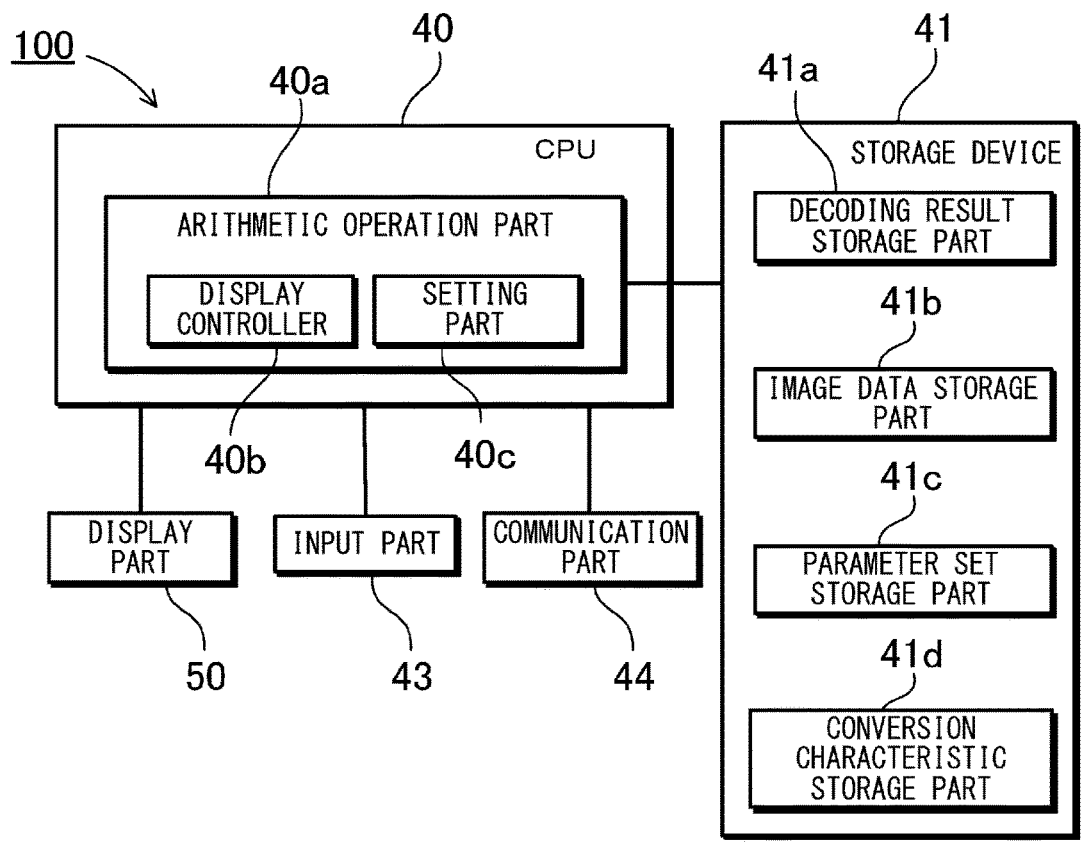
FIG. 2 is a block diagram showing a structure of a computer shown in FIG. 1.

The computer 100 serves as a management device connected to the optical information reader 1 and the display part 50 and configured to cause the display part 50 to display information on the optical information reader 1. FIG. 2 is a block diagram showing an example of the structure of the computer 100. The computer 100 shown in FIG. 2 includes the CPU 40, the storage device 41, the input part 43, a communication part 44, and the display controller 40*b*. When the optical information reader 1 is downsized, it becomes difficult to make all settings of the optical information reader 1 only with the display part and buttons provided on the optical information reader 1; therefore, the computer 100 may be prepared separately from the optical information reader 1 and be configured to make various settings of the optical information reader 1 and to transfer information on the settings to the optical information reader 1.

Further, the computer 100 and the optical information reader 1 may be connected to each other so as to be capable of bidirectional communication, and some of the above-described process to be performed by the optical information reader 1 may be performed by the computer 100. In this case, the computer 100 partially serves as some components of the optical information reader 1.

The CPU 40 is a unit configured to control each component of the computer 100 in accordance with a program stored in the storage device 41. The storage device 41 is made up of a memory, a hard disk, or the like.

The display part 50 is made up of, for example, a liquid crystal display or the like. The input part 43 is made up of a keyboard, a mouse, a touch sensor, or the like. The communication part 44 is configured to communicate with the optical information reader 1. The communication part 44 may include an I/O part, a serial communication part such as RS232C, and a network communication part such as a wireless LAN or a wired LAN to be connected to the optical information reader 1.

The CPU 40 includes an arithmetic operation part 40*a* configured to perform various arithmetic operations. The arithmetic operation part 40*a* is provided with the display controller 40*b* and a setting part 40*c*. The display controller 40*b* generates a user interface for setting imaging conditions applied to an imaging part 5 of the optical information reader 1, image manipulation conditions applied to a decoder 31, and the like, or a user interface for displaying a decoding result, image data, or the like output from the optical information reader 1 and causes the display part 50 to display such a user interface. The display part 50 may be a component of the optical information reader 1. The setting part 40*c* sets the imaging conditions applied to the imaging part 5 and the image manipulation conditions applied to the decoder 31. Note that the display controller 40*b* and the setting part 40*c* may be provided in the optical information reader 1. Further, the display controller 40*b* or the setting part 40*c* may be responsible for all or some of the functions (bank setting, and the like) of a tuning part 29*c*.

The storage device 41 is provided with a decoding result storage part 41*a*, an image data storage part 41*b*, a parameter set storage part 41*c*, and a conversion characteristic storage part 41*d*. These storage parts 41*a* to 41*d* are configured to store the same information as information stored in a decoding result storage part 35*a*, an image data storage part 35*b*, a parameter set storage part 35*c*, and a conversion characteristic storage part 35*d* of the optical information reader 1, respectively.

Further, the optical information reader 1 receives, during its operation, a reading start trigger signal indicating code reading start timing from the PLC 101 over the signal line 101*a*. Then, the optical information reader 1 captures an image of the code and decodes the code in response to the reading start trigger signal. Subsequently, the decoding result is transmitted to the PLC 101 over the signal line 101*a*. As described above, while the optical information reader 1 is in operation, the input of the reading start trigger signal and the output of the decoding result between the optical information reader 1 and an external control device such as the PLC 101 are repeated over the signal line 101*a*. Note that, as described above, the input of the reading start trigger signal and the output of the decoding result may be made over the signal line 101*a* provided between the optical information reader 1 and the PLC 101, or another signal line.

For example, a sensor configured to detect the arrival of the workpiece WK and the optical information reader 1 may be directly connected to each other such that the reading start trigger signal is input from the sensor to the optical information reader 1.

Figure 3:
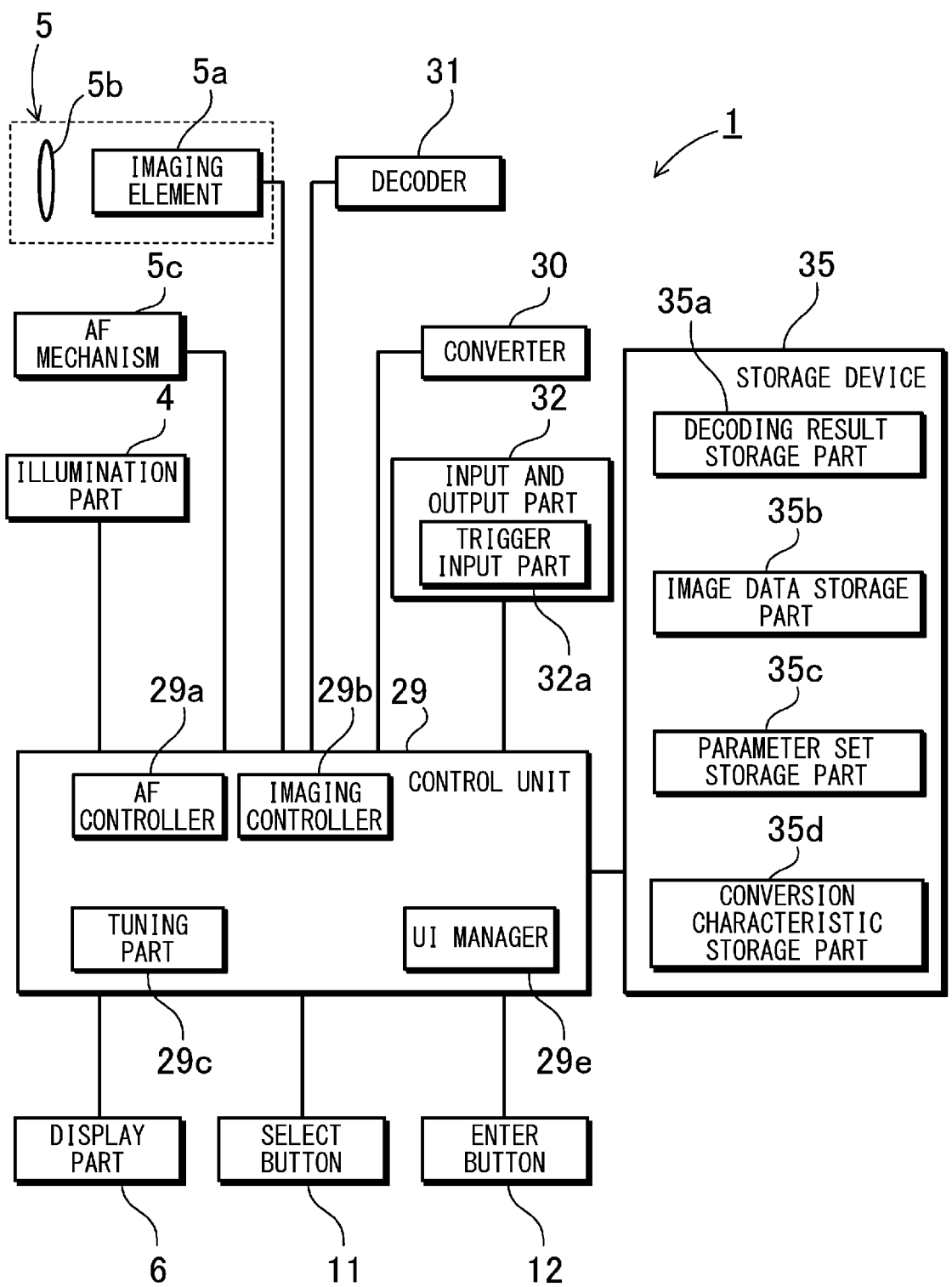
FIG. 3 is a block diagram of an optical information reader shown in FIG. 1.

FIG. 3 is a block diagram showing the structure of the optical information reader 1. As shown in FIG. 3, the optical information reader 1 includes an illumination part 4, the imaging part 5, a converter 30, the decoder 31, a control unit 29, and a storage device 35. The illumination part 4 irradiates the cord with light. The imaging part 5 receives the light emitted from the illumination part 4 and reflected off the cord to acquire an input image. The converter 30 generates a code image from the input image acquired by the imaging part 5.

When a pixel has an input value greater than a predetermined threshold, the converter 30 outputs, based on a characteristic conversion expression, an output value that varies in a manner that depends on the input value. On the other hand, when a pixel has an input value less than the threshold, the converter 30 is configured to output, as an output value, a relatively small constant value with respect to a pixel having an input value greater than the threshold. Here, the relatively small constant value is allowed to vary to a slight degree that can be ignored when the code is read.

The decoder 31 decodes the information encoded in the code based on the code image generated by the converter 30. This allows stable reading even when the contrast of the code varies. In particular, even when the brightness of the code image fluctuates, the use of the conversion characteristic that keeps the contrast value of the code image constant makes it possible to increase the ability to read a code image having a large height difference.

Further, the optical information reader 1 may be made up of dedicated hardware or a device having a program installed thereon. For example, it is possible to install an optical information reading program on a general-purpose computer to cause the computer to serve as the optical information reader. Such an optical information reading program causes such a computer to perform a function of causing the illumination part to irradiate the cord with illumination light and causing the imaging part 5 to receive reflected light reflected off the cord to acquire the input image, a function of generating the code image from the input image thus acquired, and a function of causing the decoder 31 to decode the information encoded in the code based on the code image. It is also possible to install an optical information reading system management program on a general-purpose computer to cause the computer to analyze a trouble. This optical information reading system management program causes the computer to perform a function of causing the management device to record, when the optical information reader captures, each time the trigger signal is received from outside, a plurality of images at predetermined timing until the decoder performs the reading process on the code, and the decoder succeeds in reading the code or the reading process times out and outputs, to the management device, information on timing at which the optical information reader receives the trigger signal, success and failure information on code reading, and the plurality of images captured by the imaging part, the success or failure information representing whether the reading process performed by the decoder results in success or failure and the plurality of images captured in response to the trigger signal with the the success or failure information and the plurality of images associated with the trigger signal input from the optical information reader, and to cause the display part to display a list of reading results corresponding to a plurality of the trigger signals thus recorded, a function of causing the management device to select, with the list displayed, a reading result corresponding to any trigger signal, and a function of causing the management device to cause the display part to display at least one of a plurality of images associated with the trigger signal selected.

On the other hand, an optical information reading method using the optical information reader 1 will be described. The optical information reading method includes causing the illumination part to irradiate the cord with illumination light and causing the imaging part 5 to receive reflected light reflected off the cord to acquire the input image, generating the code image from the input image thus acquired, and causing the decoder 31 to decode the information encoded in the code based on the code image.

This optical information reading method further includes causing the optical information reader to receive a trigger signal from outside, capturing, each time the trigger signal is received, a plurality of images at predetermined timing until the decoder performs the reading process on the code, and the decoder succeeds in reading the code or the reading process times out, outputting, to the management device, information on timing at which the optical information reader receives the trigger signal, success or failure information on code reading, and the plurality of images captured by the imaging part, causing the management device to record the success or failure information representing whether the reading process performed by the decoder results in success or failure and the plurality of images captured in response to the trigger signal with the the success or failure information and the plurality of images associated with the trigger signal input from the optical information reader.

An error cause analysis method for analyzing a cause when an error occurs in the optical information reading system includes causing the optical information reader to receive a trigger signal from outside, capturing, each time the trigger signal is received, a plurality of images at predetermined timing until the decoder performs the reading process on the code, and the decoder succeeds in reading the code or the reading process times out, outputting, to the management device, information on timing at which the optical information reader receives the trigger signal, success or failure information on code reading, and the plurality of images captured by the imaging part, causing the management device to record the success or failure information representing whether the reading process performed by the decoder results in success or failure and the plurality of images captured in response to the trigger signal with the the success or failure information and the plurality of images associated with the trigger signal input from the optical information reader, selecting, with a list of reading results corresponding to a plurality of the trigger signals displayed on the display part, a reading result corresponding to any trigger signal, and causing the display part to display at least one of a plurality of images associated with the trigger signal selected.

The error cause analysis method may further include identifying, with an image displayed on the display part, the cause of the error that occurs in the optical information reading system from a trouble related to data input and output between an external device and the optical information reader, a trouble related to data communication between the external device and the optical information reader, and a trouble related to code reading by the optical information reader.

(Tuning Part 29c)

The optical information reader 1 may further include the tuning part 29c. The tuning part 29c selects one of a plurality of characteristic conversion expressions created in advance and having different offset amounts based on the ability to respond to fluctuations in brightness of a code image and a code image low in contrast. Further, the tuning part 29c may be configured to select a conversion characteristic expression high in ability to respond to fluctuations in brightness of a code image.

(Structure of Imaging Part 5)

The imaging part 5 includes an imaging element 5a configured to capture an image of a code attached to the workpiece WK and illuminated by the illumination part 4, an optical system 5b with a lens, and the like, and an autofocus mechanism (AF mechanism) 5c. Light reflected off a part of the workpiece WK where the code is attached impinges on the optical system 5b. The imaging element 5a is an image sensor made up of a light receiving element such as a charge-coupled device (CCD) or complementary metal oxide semiconductor (CMOS) configured to convert the image of the code obtained through the optical system 5b into an electric signal. The imaging element 5a is connected to the control unit 29, and the electric signal converted by the imaging element 5a is input to the control unit 29. Further, the AF mechanism 5c is a mechanism configured to adjust the focus by changing the position or refractive index of a focusing lens among lenses making up the optical system 5b. The AF mechanism 5c is also connected to the control unit 29 and is controlled by an AF controller 29a of the control unit 29.

The optical information reader 1 may be further provided with a display window. The display window is made up of, for example, an organic EL display, a liquid crystal display, or the like. The display window is connected to the control unit 29 and is capable of displaying, for example, the code whose image is captured by the imaging part 5, a character string representing a result of decoding the code, a reading success rate, a matching level, or the like. The reading success rate is an average read success rate when the reading process is performed a plurality of times. The matching level is a reading margin indicating readability of a code that has been successfully decoded. This can be obtained from the number of error corrections made during decoding and the like, and can be represented numerically, for example. The smaller the number of error corrections, the higher the matching level (reading margin), while the larger the number of error corrections, the lower the matching level (reading margin). (Converter 30)

The optical information reader 1 includes the converter 30. The converter 30 is connected to the control unit 29. The converter 30 is configured to generate a second image by converting pixel values of a first image acquired by the imaging element 5a into pixel values based on a predetermined conversion characteristic. The first image can be referred to as a pre-conversion image. The second image can be referred to as a converted image. The conversion characteristic used by the converter 30 when converting the pixel values of the first image is stored in advance in the conversion characteristic storage part 35d of the storage device 35 to be described later.

(Decoder 31)

The optical information reader 1 includes the decoder 31 configured to decode black-and-white binary data. A table showing contrast relationships of encoded data can be used for decoding. Further, the decoder 31 checks whether the decoding result is correct under a predetermined check method. When an error is found in the data, an error correction function is used to calculate correct data. The error correction function differs in a manner that depends on the type of code.

According to the present embodiment, the decoder 31 decodes the code included in the second image converted by the converter 30. The decoder 31 is configured to write, to the storage device 35, the result of decoding the code. Further, the decoder 31 performs image manipulation such as the application of various image manipulation filters to the second image before being decoded.

(Input and Output Part 32)

The optical information reader 1 includes an input and output part 32. The input and output part 32 is a member configured to perform input from and output to an external device, and is made up of a data communication interface or I/O interface. In the example shown in FIG. 1, the optical information reader 1 communicates data with the computer 100 and the PLC 101 via the input and output part 32. The input and output part 32 may include an I/O part, a serial communication part such as RS232C, and a network communication part such as a wireless LAN or a wired LAN to be connected to the computer 100 and the PLC 101.

In the example shown in FIG. 1, the trigger signal TGS issued by the trigger generator TGG is received by the PLC 101 and is then transmitted from the PLC 101 to the optical information reader 1. Therefore, the input and output part 32 serves as a trigger input part 32a configured to receive the trigger signal. However, the optical information reader 1 may be configured to directly receive the trigger signal from the trigger generator TGG.

(Control Unit 29)

The control unit 29 shown in FIG. 3 is a unit configured to control each component of the optical information reader 1 and may be made up of a CPU, an MPU, a system LSI, a DSP, dedicated hardware, or the like. The control unit 29 has various functions as described later, and such functions may be implemented by a logic circuit, or via execution of software.

The control unit 29 includes the AF controller 29a, an imaging controller 29b, the tuning part 29c, and a UI manager 29e. The AF controller 29a is a unit configured to control the AF mechanism 5c and is capable of adjusting the focus of the optical system 5b with the conventionally known contrast AF or phase difference AF.

The imaging controller 29b is a unit configured to adjust gain, to control light intensity of the illumination part 4, and to control an exposure time (shutter speed) of the imaging element 5a. Here, the gain is an amplification factor (also referred to as a magnification) when the brightness of the image output from the imaging element 5a is amplified by digital image manipulation. Individual control of a first light emitting diode 16 and a second light emitting diode 17 can change the light intensity of the illumination part 4. The gain, the light intensity of the illumination part 4, and the exposure time are brightness parameters that determine the brightness of the data image and serve as imaging conditions applied to the imaging part 5.

The tuning part 29c is a unit configured to change the imaging conditions such as the gain, the light intensity of the illumination part 4, and the exposure time, and the image manipulation conditions applied to the decoder 31. The image manipulation conditions applied to the decoder 31 includes a coefficient of the image manipulation filter (strength and weakness of the filter), switching, when there are a plurality of the image manipulation filters, the image manipulation filters, a combination of different types of image manipulation filters, and the like. Suitable imaging conditions and image manipulation conditions differ in a manner that depends on the influence of external light on the workpiece WK during transfer, the color and material of the surface to which the cord is attached, or the like. Therefore, the tuning part 29c searches for more suitable imaging conditions and image manipulation conditions to determine processes to be performed by the AF controller 29a, the imaging controller 29b, and the decoder 31. Examples of the image manipulation filter include various known filters.

The tuning part 29c is configured to use the first image acquired by the imaging part 5 at the time of settings on the optical information reader 1 made before the optical information reader 1 is put into operation to cause the converter 30 to generate the second image in accordance with a plurality of different conversion characteristics stored in the conversion characteristic storage part 35d, and to analyze results of decoding, by the decoder 31, each code contained in the second image thus generated to select one of the plurality of different conversion characteristics. The procedure of processes performed by the tuning part 29c will be described in detail with reference to the flowchart to be described later, and the outline of the procedure is as follows.

Specifically, before the optical information reader 1 is put into operation, the settings on the optical information reader 1 is made as an operation preparation stage. When the settings are made on the optical information reader 1, various settings are made by transmitting various commands for the settings from the computer 100 connected to the optical information reader 1 via the signal line 101a. For the settings, the tuning part 29c performs tuning. When the tuning is performed, the imaging part 5 captures the image of the code attached to the workpiece WK to acquire the first image. The second image is generated from pixel values converted from the pixel values of the first image thus acquired in accordance with one conversion characteristic among the conversion characteristics stored in the conversion characteristic storage part 35d. Further, the second image is generated from pixel values converted from the pixel values of the first image acquired in accordance with another conversion characteristic among the conversion characteristics stored in the conversion characteristic storage part 35d. When at least three conversion characteristics are stored in the conversion characteristic storage part 35d, the converter 30 can generate at least three second images.

Then, the decoder 31 decodes each of the codes contained in the plurality of second images thus generated, and the tuning part 29c analyzes the reading margin indicating the readability of the code that has been successfully decoded. As a result of analyzing the read margin, the tuning part 29c selects the conversion characteristic of the second image having the high reading margin. After the settings on the optical information reader 1 has been made, while the optical information reader 1 is in operation, the converter 30 generates the second image from the first image acquired by the imaging part 5 in accordance with the conversion characteristic selected by the tuning part 29c, and then the decoder 31 decodes the second image.

The tuning part 29c may be configured to cause, when the settings are made on the optical information reader 1, the imaging part 5 to acquire one first image and cause the converter 30 to generate, from the one first image, a plurality of second images in accordance with a plurality of different conversion characteristics stored in the conversion characteristic storage part 35d. In this case, when the settings are made on the optical information reader 1, as many second images as the number of conversion characteristics stored in the conversion characteristic storage part 35d are generated.

Further, the tuning part 29c may be configured to cause, when the settings are made on the optical information reader 1, the imaging part 5 to acquire a plurality of first images and cause the converter 30 to generate, from each of the plurality of first images, a plurality of second images in accordance with a plurality of different conversion characteristics stored in the conversion characteristic storage part 35d. In this case, since the plurality of first images are acquired when the settings are made on the optical information reader 1, as many second images as the number resulting from multiplying the number of the first images by the number of conversion characteristics stored in the conversion characteristic storage part 35d are generated.

Further, the tuning part 29c may be configured to cause, when the settings are made on the optical information reader 1, the imaging part 5 to capture and acquire a plurality of first images under different imaging conditions. The imaging conditions include the gain, the light intensity of the illumination part 4, the exposure time, and the like.

The UI manager 29e shown in FIG. 3 is a unit configured to display, on the display window, various interfaces, the code captured by the imaging part 5, the character string representing the result of decoding the code, the reading success rate, the matching level, and the like, to receive input from a select button 11 and an enter button 12, and to control lighting of an aimer provided on a surface of a housing of the optical information reader. (Storage device 35)

The storage device 35 includes the decoding result storage part 35a, the image data storage part 35b, the parameter set storage part 35c, and the conversion characteristic storage part 35d. The storage device 35 may be made up of a semiconductor memory, a hard disk, or the like. The decoding result storage part 35a is a part where the decoding result from the decoder 31 is stored. The image data storage part 35b is a part where the image captured by the imaging element 5a is stored.

The conversion characteristic storage part 35d is a part where the plurality of different conversion characteristics used by the converter 30 for conversion of the pixel values of the first image are stored. Each conversion characteristic is a gradation conversion characteristic, and a plurality of conversion characteristics containing different y values of gamma conversion are stored in advance in the conversion characteristic storage part 35d.

The parameter set storage part 35c shown in FIG. 3 is a part where information on settings made by a setting device such as the computer 100, information on settings made by the select button 11 and the enter button 12, and the like are stored. In this parameter set storage part 35c, a parameter set containing a plurality of parameters that make up either the imaging conditions applied to the imaging part 5 (gain, light intensity of the illumination part 4, exposure time, and the like) or the image manipulation conditions applied to the decoder 31 (type of image manipulation filter, and the like) can be stored.

(Identification of Cause of Error)

When an error or trouble occurs in the optical information reading system, it is required to promptly solve the trouble. In particular, for a distribution field such as a distribution warehouse, a quick delivery is demanded, so that immediate recovery is required, and the cause of the error needs to be identified for the immediate recover.

However, it is not easy to identify the cause of the error. For example, it is conceivable to check the status of the optical information reader using a Web monitor or the like. The Web monitor is configured to acquire reading statistical information collected by the code reader alone through connection between the code reader and a PC, the connection being established by inputting an IP address assigned to the code reader into a Web browser of the PC.

However, since a stationary code reader captures a large number of images, it is not practical to store, in the code reader, all the images that are possibly subjected to analysis. For this reason, the Web monitor is used only for confirming the statistical information collected by the code reader alone, and it is not always possible to acquire information sufficient for determining the cause of the trouble.

Figure 4:
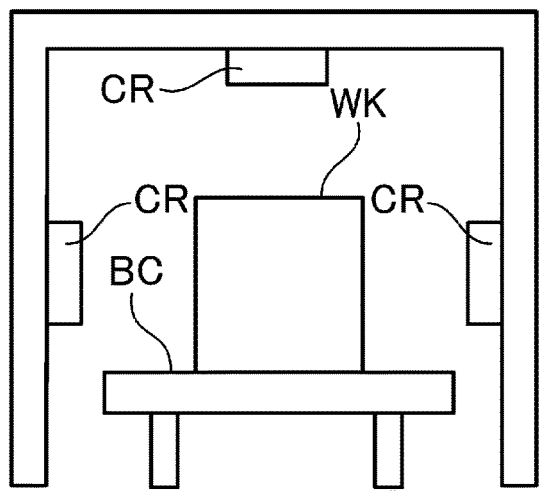
FIG. 4 is a schematic diagram showing a state where a scan tunnel is constructed of a plurality of code readers.

In particular, code reading in the distribution industry includes reading of a plurality of sides using a plurality of code readers in addition to reading using a single code reader. For example, as shown in FIG. 4, a configuration may be employed where a scan tunnel is constructed of a plurality of code reader CRs to avoid a situation where a single code reader CR fails to read all sides. In such a case, when the reading statistical information is acquired by the method using the Web monitor, respective pieces of data of three code readers CR are only displayed, and it is therefore difficult to determine how the system works as a whole.

On the other hand, another configuration may be employed where the code readers transmit images to an external device such as a PC via FTP. However, even in this case, it is extremely difficult for the user to find a desired image from a large number of images stored in the PC. For example, when read images are recorded via FTP, a large number of similar images are acquired, and it is therefore difficult to find a desired image from the images displayed in list form. For each piece of image data, although individual information such as a time stamp and a MAC address remains, it is extremely difficult to determine which image is a desired image. Further, when such an image is read by a plurality of code readers as described above, as many images as the N times the number of the code readers are acquired accordingly, and it is therefore more difficult to identify an image.

As described above, a reading system using a stationary code reader in the related art has a problem that makes it difficult for the user to find an image to be checked. Further, when the image can be found with difficulty, and a result of checking the image shows no problem, it is waste work because the cause of the problem needs to be isolated again.

Therefore, in the optical information reading system according to the present embodiment, the read image captured by the optical information reader 1 is registered in a database to increase accessibility to a read error image. For example, in a configuration where a plurality of the optical information readers 1 perform the reading in a coordinated manner, for example, when the optical information readers 1 are each configured to serve as a master or a slave and act in a coordinated manner, a "group name", a "master/slave ID", and a "master/slave trigger ID" for use in causing the plurality of optical information readers 1 to act in a coordinated manner.

Figure 5:
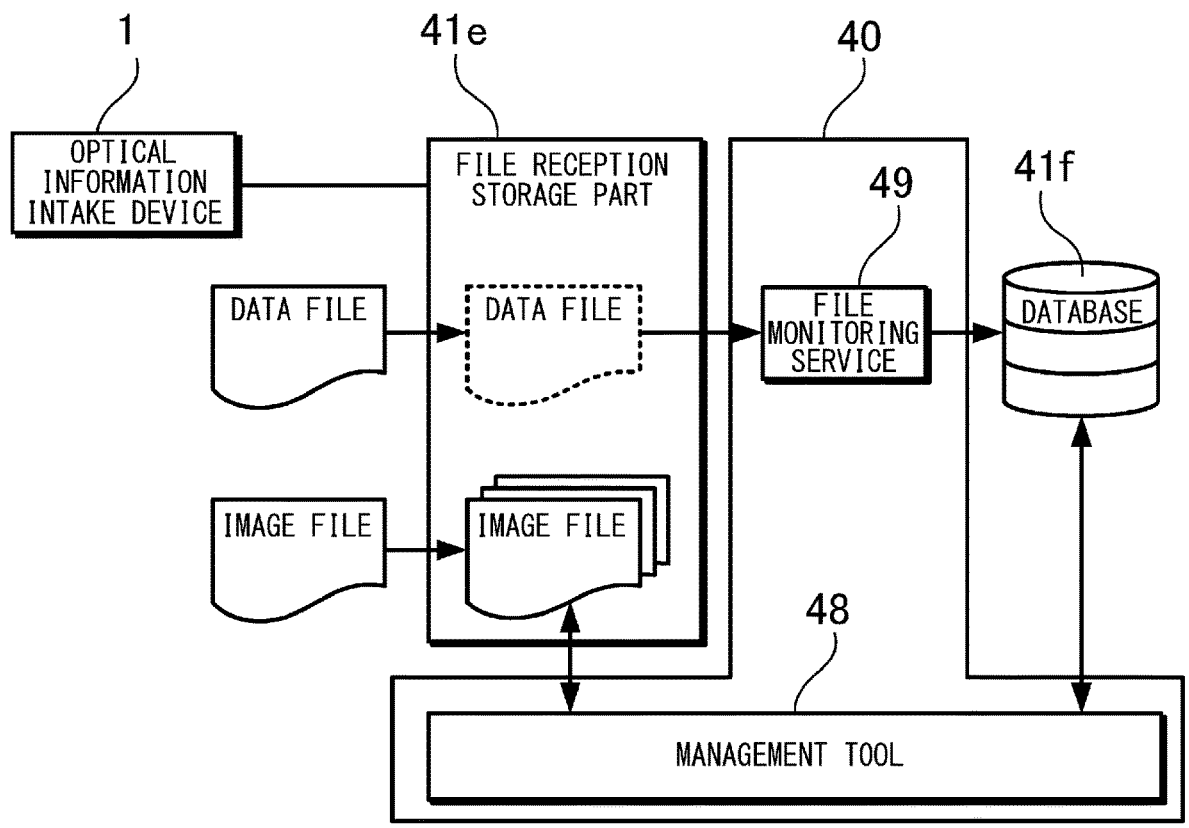
FIG. 5 is a block diagram showing an example of a system structure for registering images.

Further, FIG. 5 is a block diagram showing an example of a structure of such a system configured to register images. As shown in FIG. 5, the optical information reader 1 is communicatively connected to the computer 100 serving as a host computer. The computer 100 includes a file reception storage part 41e, the CPU 40, and a database 41f. The CPU 40 is configured to perform a function of a management tool 48 and a function of a file monitoring service 49. Image files and data files generated by the optical information reader 1 are transmitted to the computer 100. The computer 100 receives such image files and data files and stores the image files and data files into the file reception storage part 41*e*. The file reception storage part 41*e* is implemented by the storage device 41 or the like included in the computer 100 shown in FIG. 2. The data files each contain various results related to code reading by the optical information reader 1 and information representing an association with the image file.

Further, the database 41*f* is a database having the data files imported therein. This database 41*f* is created by the file monitoring service 49 and used by the management tool 48. The file monitoring service 49 is an application to be run by the CPU 40 and is configured to monitor the file reception storage part 41*e* to perform various processes. Specifically, such processes mainly include storing the contents of the data file into the database 41*f* and deleting the data file. This causes, when the management tool 48 is not running, but the computer 100 is powered on, the database 41*f* to be constantly updated and allows data to be perused immediately after the management tool 48 is started. The other processes to be performed by the file monitoring service 49 include a process of organizing the image files. For example, in accordance with user settings, the image files are grouped into folders by date, or an old image file is deleted. Further, the other processes further include a process of deleting information on the database 41*f* in accordance with the user settings.

Furthermore, the management tool 48 is also an application to be run by the CPU 40, and provides various pieces of information to the user based on the information on the database 41*f*. For example, result data within a specified period, a graph, a list, image files associated with the result data, and the like are displayed.

Figure 6:
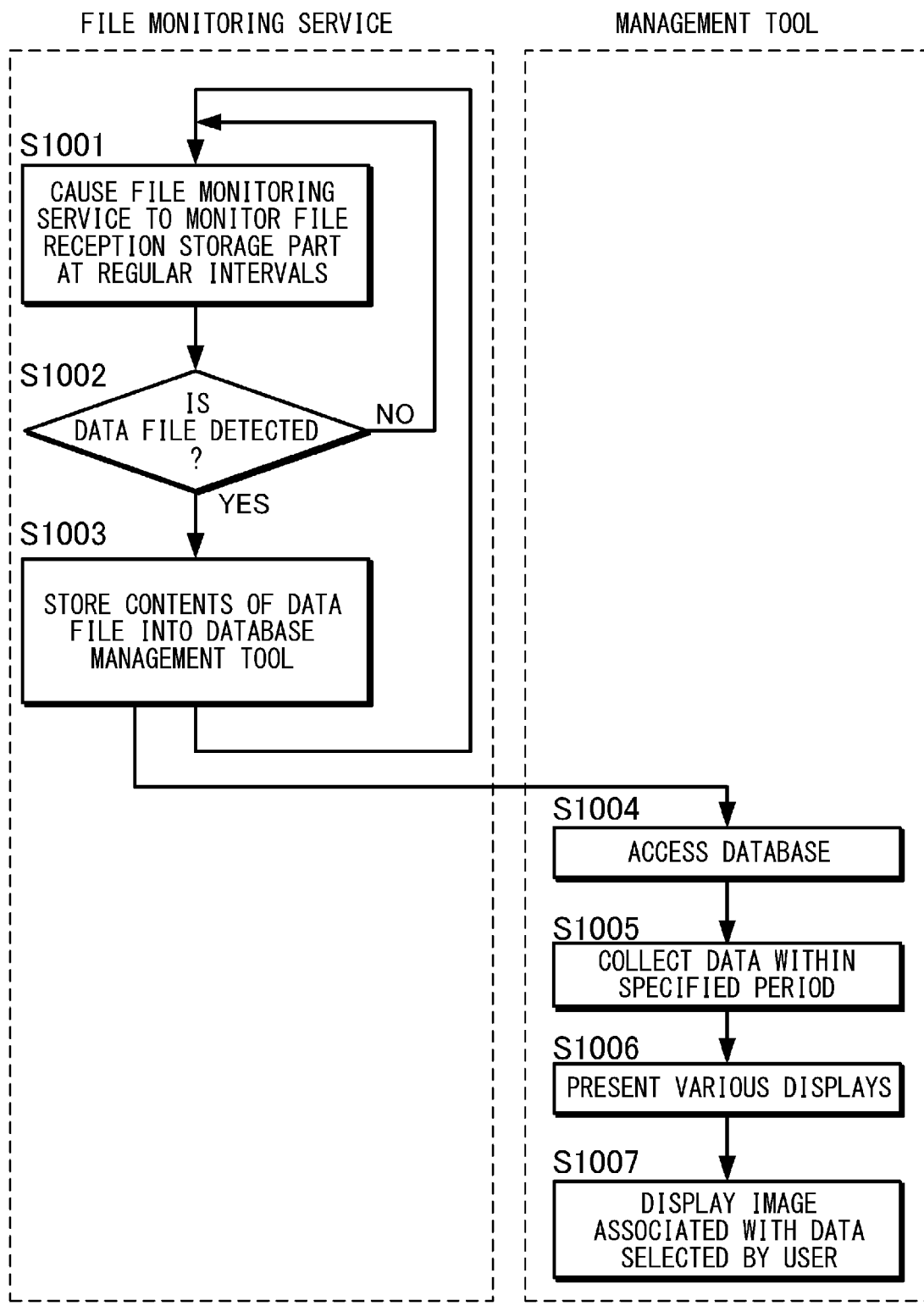
FIG. 6 is a flowchart showing processing performed by a file monitoring service and a management tool.

Next, the processes to be performed by the file monitoring service 49 and the management tool 48 will be described with reference to the flowchart shown in FIG. 6. First, in step S1001, the file monitoring service 49 monitors the file reception storage part at regular intervals. Then, in step S1002, a determination is made as to whether a data file is detected, and if not detected, the process returns to step S1001 and is then repeated. When the data file is detected, the process proceeds to step S1003, and the contents of the data file are stored into the database 41*f*. At this time, the data file itself is deleted. Subsequently, the process returns to step S1001 and is then repeated. On the other hand, the management tool 48 accesses the database 41*f* in step S1004. Next, in step S1005, pieces of data within a specified period are collected. Further, in step S1006, various displays are presented. For example, successes and errors in reading are grouped and displayed in graph form or list form. Finally, in step S1007, an image associated with the data selected by the user is displayed.

(Monitor Screen 80)

Figure 7:
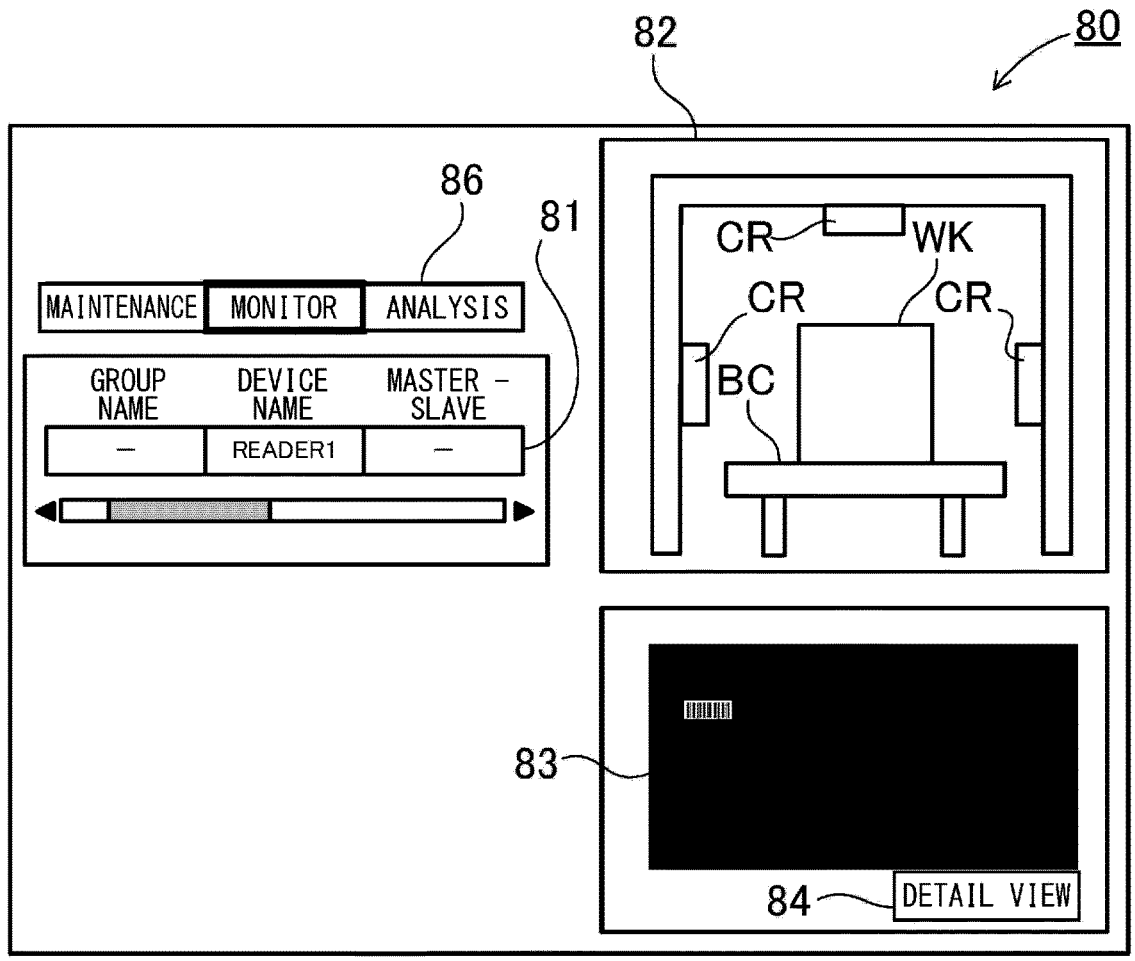
FIG. 7 is an image diagram showing an example of a monitor screen of the management tool.
Figure 8:
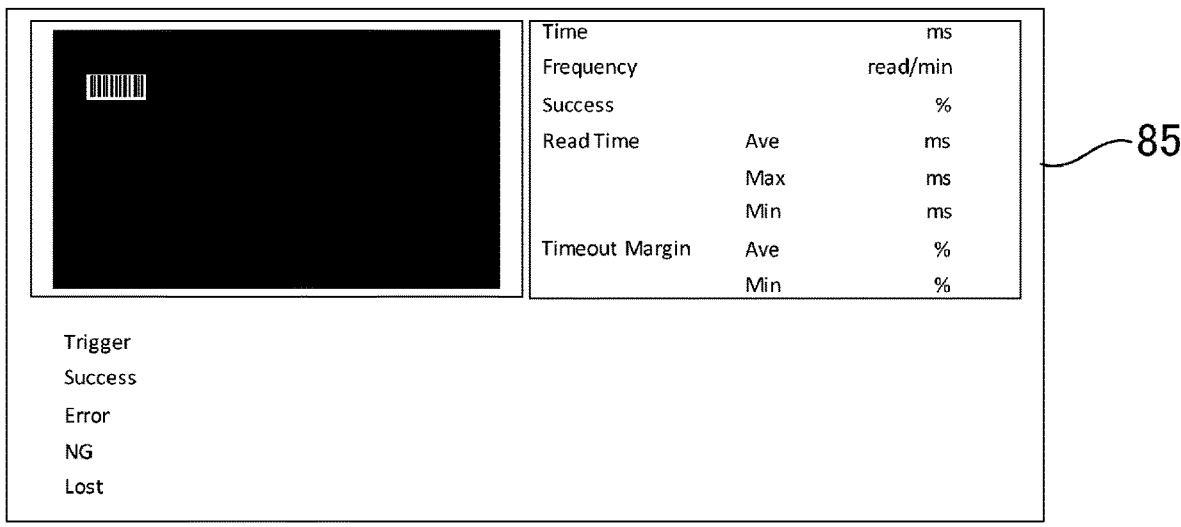
FIG. 8 is an image diagram showing an example of a detailed view screen.

FIG. 7 is a diagram showing an example of a monitor screen 80. On the monitor screen 80, a list table 81 showing a list of pieces of information on connected devices is displayed at the left side. An image 82 of the optical information reading system made up of the plurality of optical information readers 1 is displayed at the upper right, and an optical information reader selected from the list table 81 is displayed in a frame shape. Further, in an image display field 83 located at the lower left, an image read in real time by this optical information reader is displayed. It is also possible to display detailed information on each device. Specifically, when a "detailed view" button 84 provided at the lower right of the image display field is pressed, a detailed view screen 85 shown in FIG. 8 is displayed. Statistical information can be confirmed on the detailed view screen 85.

(Error Analysis Report)

The optical information reading system further has an error analysis report generation function. The error analysis report generation function is a function of generating and outputting contents of error analysis as an error report. This procedure will be described with reference to FIGS. 9 to 12.

Report data may be made up of a plurality of pieces of data. Here, three types of report data, summary data 110, read data list, and image list, are created.

(Summary Data 110)

Figures 9, 10:
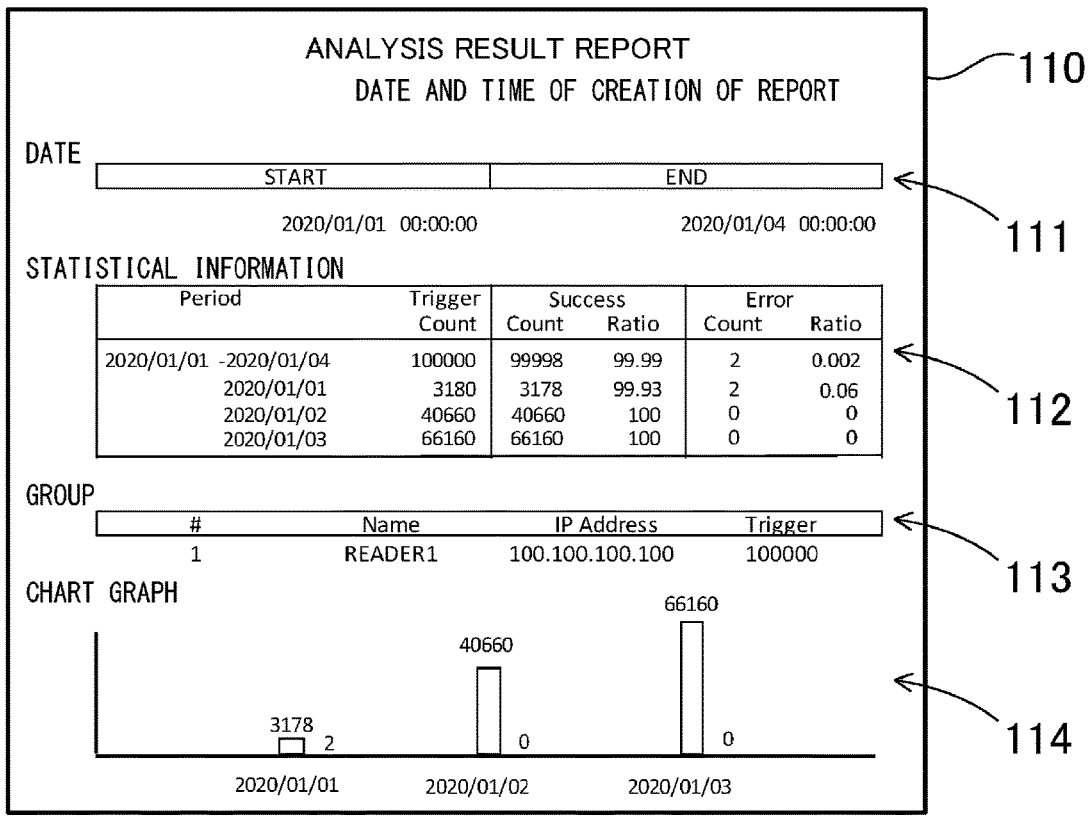
FIG. 9 is an image diagram showing an example of summary data.
FIG. 10 is an image diagram showing an example of a read data list.

FIG. 9 shows an example of the summary data 110. In the summary data 110, a date field 111 shows a period from start to end of reading. Further, a statistical information field 112 shows the number of successes/failures in reading on a daily basis. Further, in a group field 113, when a plurality of optical information readers 1 act in a coordinated manner, a group name of the optical information readers 1 is displayed. Finally, in a chart field 114, a success in reading and an error in reading are displayed in green and red, respectively, in chart form.

(Read Data List 115)

FIG. 10 shows an example of a read data list 115. The read data list 115 is a list of reading results.

(Image List)

Figure 11:
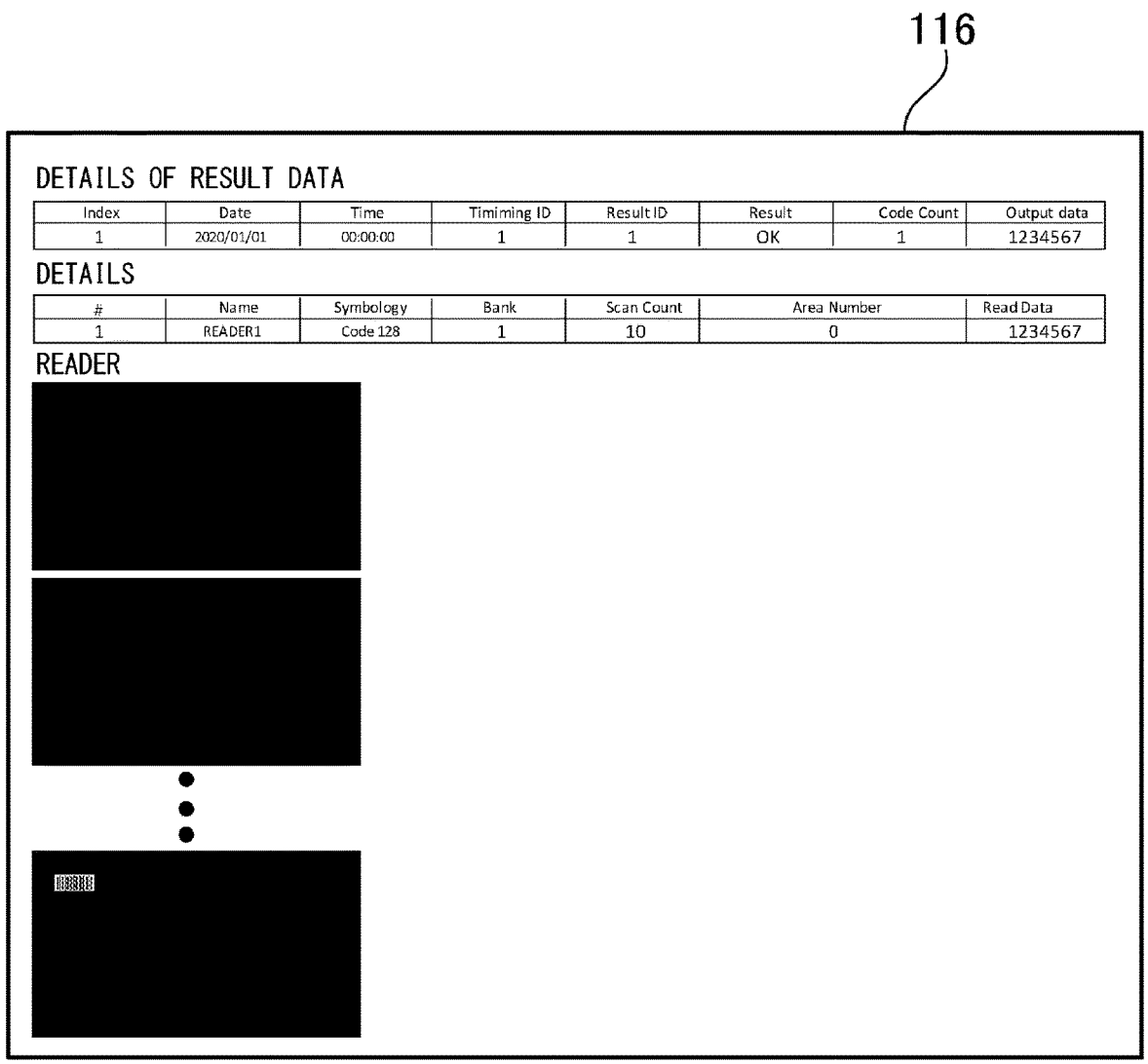
FIG. 11 is an image diagram showing an example of an image list when reading results in success.

The image list is a list of images acquired in response to the trigger signal. FIG. 11 shows an example of an image list 116 when the reading results in success. FIG. 12 shows an example of an image list 117 when reading results in failure. As described above, since a plurality of images are displayed in the image list in chronological order, and it is therefore possible to visually grasp what kind of image has been captured. For example, the example in FIG. 11 shows that an image containing the correct code has been captured. On the other hand, the example in FIG. 12 shows that the code is not correctly displayed in the captured images. This reveals that the error is caused by a hidden code, and it is therefore possible to submit the reason as a report.

(Examples of Troubles that Occur in Optical Information Reading System)

Further, in the optical information reading system according to the present embodiment, when the code is read, not only the read image is recorded, but also the status information on the optical information reader is added, and the read image and the status information are associated with each other and stored, thereby facilitating solving a reading problem.

Here, examples of troubles that occur in the optical information reading system include the following three examples as specific examples of troubles.

(Trouble 1: Input and Output Trouble)

The input and output trouble is a trouble related to data input and output between the external device and the optical information reader 1. In this case, a read image and input and output terminal status information on the external device and the optical information reader 1 are used for determining the cause.

(Trouble 2: Communication Trouble)

The communication trouble is a trouble related to data communication between the external device and the optical information reader 1. In this case, a read image, PLC link, Ethernet/IP, PROFINET map status, and Ethernet communication diagnostic information are used for determining the cause. Alternatively, the read image and command exchange information are used.

(Trouble 3: Reading Trouble)

The reading trouble is a trouble related to reading of the code by the optical information reader 1. In this case, the read image and information before and after the read image are used for determining the cause. Alternatively, the read image and reading attempt parameter information are used.

(Procedure for Analyzing Cause of Error)

Figure 13:
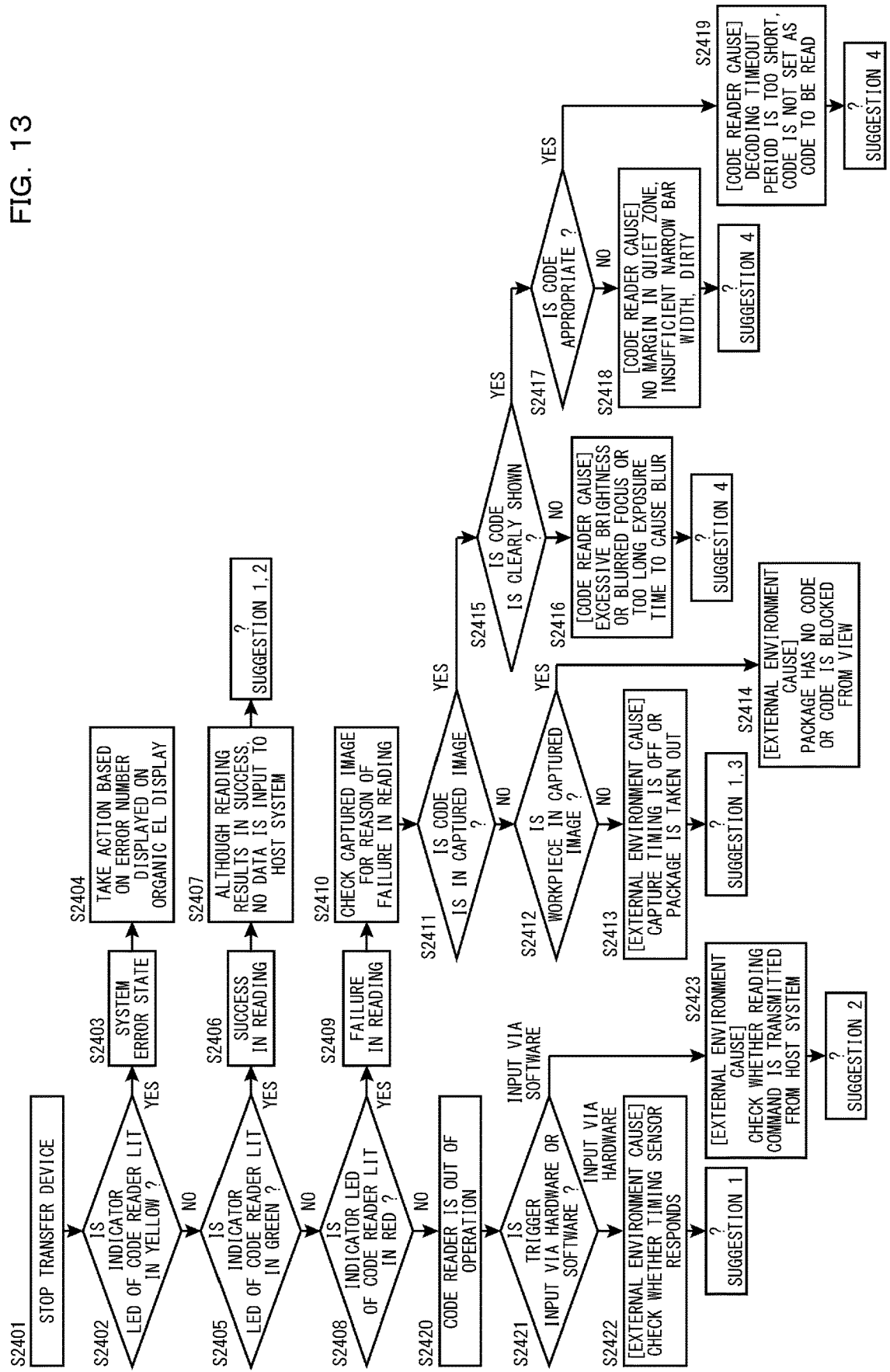
FIG. 13 is a flowchart showing a procedure for analyzing a cause of a trouble that occurs in the optical information reading system.

For such various troubles, a problem analysis flow for determining each cause is performed in accordance with a procedure as shown in FIG. 13.

Further, success in reading, failure in reading, and system error in the optical information reader 1 need to be identified. Herein, as described above, an emission color of an indicator provided on the surface of the housing of the optical information reader is set so as to change to blue when the reading of the code results in success, to red when the reading of the code results in failure, and to yellow when a system error occurs.

On the basis of the above-described assumptions, the procedure for analyzing the cause of the error will be described with reference to FIG. 13. First, in step S2401, it is assumed that the transfer device such as the transfer belt conveyor BC is stopped. In this case, first, in step S2402, a determination is made as to whether the indicator of the optical information reader 1 is lit in yellow. The indicator lit in yellow indicates a system error state (step S2403), so that an action is taken based on a corresponding error number (step S2404). In general, the error numbers are assigned in advance to various expected errors, their respective countermeasures are prepared on the device side, and when an error occurs, a corresponding error number is output.

On the other hand, when the indicator is not lit in yellow in step S2402, the process proceeds to step S2405 to determine whether the indicator of the optical information reader 1 is lit in green. The indicator lit in green indicates that the reading results in success (step S2406); therefore, on the assumption that, although the reading results in success, no data is input to the host system (step S2407), both or either of the above-described trouble 1 (input and output trouble) and trouble 2 (communication trouble) may be the cause. Therefore, as a countermeasure, the input and output terminal information is checked for hardware. For software, the PLC link, Ethernet/IP, PROFINET map status, Ethernet communication diagnostic information, and command log are checked.

On the other hand, when the indicator is not lit in green in step S2405, the process proceeds to step S2408 to determine whether the indicator of the optical information reader 1 is lit in red. The indicator lit in red indicates that the reading results in failure (step S2409), so that the captured image is checked for the reason of the failure in reading (step S2410). Here, first, in step S2411, a determination is made as to whether the code is in the captured image, and if no code is in the captured image, the process proceeds to step S2412 to determine whether the workpiece is in the captured image. When no workpiece is in the captured image, the error possibly lies in an external environment other than the optical information reading system (external environment cause). Here, the possibility that the capture timing is off or the package is taken out is examined (step S2413). As a countermeasure in this case, the input and output terminal information is checked for hardware. For software, previous and following images are checked.

When it is determined that no workpiece is in the captured image in step S2412, the possibility that no code is attached to the package or the code is blocked from view is examined for external environment cause (step S2414). As a countermeasure in this case, for example, an error message such as "Check if the code is attached to the package transferred or if the code is hidden by the sidebar, or the like" is displayed to prompt the user to confirm.

On the other hand, when it is determined that the code is in the captured image in step S2411, the process proceeds to step S2415 to determine whether the code is clearly shown. When it is determined that the code is clearly shown, the cause of the error possibly lies in the optical information reader 1. Here, the error possibly arises from excessive brightness, blurred focus when the image is captured, a too long exposure time to cause the image to appear blurred (step S2416). As a countermeasure in this case, for example, "Tune again because brightness may be inappropriate" or "Adjust the autofocus again because focal length may be inappropriate" is displayed to prompt the user to take action.

Further, when it is determined that the code is not clearly shown in step S2415, a determination is made as to whether the code is appropriate in step S2417. When it is determined that the code is inappropriate, the cause of the error probably lies in the code. Possible causes include that there is no margin in the quiet zone of the cord, that the narrow bar width is too small, and that the cord is dirty (step S2418). As a countermeasure in this case, for example, "Check because the code may be printed incorrectly" is displayed to prompt the user to take action.

Furthermore, when it is determined that the code is appropriate in step S2417, the cause of the error possibly lies in the optical information reader 1. Possible causes include that the decoding timeout period is too short, that the code is not set as a code to be read, and the like (step S2419). As a countermeasure in this case, for example, "Tune again because reading timeout period of the code reader may be inappropriate" is displayed to prompt the user to take action.

On the other hand, when the indicator of the optical information reader 1 is not lit in red in step S2408, it indicates that the optical information reader 1 is out of operation (step S2420). Here, in step S2421, a determination is made as to whether the trigger is input via hardware or software. When the trigger is input via hardware, whether a timing sensor responds is checked for external environment cause (step S2422). As a countermeasure in this case, the input and output terminal information is checked for hardware.

In step S2421, when the trigger is input via software, whether a reading command is transmitted from the host system is checked for external environment cause (step S2423). As a countermeasure in this case, for software, the PLC link, Ethernet/IP, PROFINET map status, Ethernet communication diagnostic information, and command log are checked.

Through analysis of the cause of the error in such a procedure, a necessary countermeasure is taken to restore the optical information reading system. However, the above-described procedure is insufficient to determine the cause and the countermeasure against the cause in detail.

To cope with this, in the optical information reading system according to the present embodiment, when an operation such as reading is performed in response to the trigger signal, the imaging part 5 captures and stores an image, and the image thus captured and internal information on the optical information reader 1 are associated with each other. During error analysis, the image and internal information thus associated with each other are presented, thereby facilitating solving a problem.

As shown in FIG. 1, the optical information reading system includes the optical information reader 1, the display part 50 configured to display information on the optical information reader 1, and the management device that is the computer 100. As shown in FIG. 3, the optical information reader 1 includes the trigger input part 32a configured to receive the trigger signal from outside, the decoder 31 configured to perform the reading process on the code, the imaging part 5, and the output part. The imaging part 5 is disposed to be able to read the code. Each time the trigger input part 32a receives the trigger signal, the imaging part 5 captures a plurality of images at predetermined timing until the decoder 31 succeeds in reading the code, or the reading process times out. Further, the output part outputs, to the management device, information on timing at which the optical information reader 1 receives the trigger signal, success or failure information on code reading, and the plurality of images captured by the imaging part 5. The input and output part 32 shown in FIG. 3 may be used as this output part.

The trigger signal is associated with the success or failure information representing whether the reading process performed by the decoder 31 results in success or failure. The trigger signal is also associated with the plurality of images captured in response to the trigger signal.

The computer 100 serving as the management device causes the display part 50 to display reading results corresponding to the plurality of trigger signals. In this state, when the user selects a reading result associated with any desired trigger signal, at least one of a plurality of images associated with the trigger signal thus selected is displayed on the display part 50. This configuration allows, when any problem occurs in the optical information reading system, the work of identifying the cause to be easily performed. Specifically, this configuration allows a corresponding image to be easily found using a trigger as a starting point to contribute to the identification of the cause of the problem.

When the optical information reader 1 causes the decoder 31 to read the code in response to the trigger signal, the input and output part 32 transmits the trigger signal together with the plurality of images and the status information on the optical information reader 1 to the computer 100. The computer 100 stores the plurality of images and the status information with the plurality of images and the status information associated with the trigger signal, calls the plurality of images and the status information as needed, and causes the display part 50 to display the plurality of images and the status information.

For example, the computer 100 causes the display part 50 to display a first screen 51 configured to display a timing chart and a second screen 52 configured to display an image. The first screen 51 displays a timing chart 53 where a plurality of pieces of timing information collected from the optical information reader 1 are displayed on a common time axis.

Further, the second screen 52 displays success or failure information on code reading and an image. The second screen 52 may display both success or failure information on a plurality of times of code reading collected from the optical information reader 1 and the plurality of images in a comparable manner.

The first screen 51 and the second screen 52 may be displayed simultaneously as one screen of the display part 50, or may be switchably displayed. Further, a configuration may be employed where a jump from the first screen 51 displayed on the display part 50 to the second screen 52 is allowed. For example, when a reading result associated with any trigger signal is selected on the timing chart 53 displayed on the first screen 51, the display screen of the display part 50 is automatically changed so as to cause an image captured in response to the trigger signal to be displayed on the second screen 52.

The computer 100 may include a trigger selection part configured to select, with the timing chart 53 displayed on the first screen 51 of the display part 50, any trigger signal or a reading result associated with a trigger signal on the timing chart 53. When any trigger signal or a reading result associated with a trigger signal is selected by the trigger selection part, at least one of the plurality of images associated with the trigger signal can be displayed on the display part 50. Such a configuration makes it possible to easily call an image associated with the trigger signal selected from the plurality of trigger signals displayed on the timing chart 53 in chronological order. For example, when a trouble occurs in the optical information reading system, a trigger signal recorded at around timing at which the trouble occurs and associated with success or failure information representing failure in reading is selected, and then an image associated with the trigger signal is called, thereby allowing a situation when the trouble occurs to be checked.

As the trigger selection part, an input device such as a mouse or keyboard connected to the computer 100 or a touch screen of the display part 50 may be used.

Further, a configuration may be employed where, when a display is presented on the display part 50, a trigger signal associated with success or failure information representing failure in reading is displayed on the display part 50. Accordingly, it is possible to present a display without a trigger associated with the success or failure information representing success in reading that is not required for identification of the cause when a problem occurs, allowing the work of identifying the cause to be smoothly performed.

As described above, according to the present embodiment, a user interface where the internal information (timing chart 53) on the optical information reader 1 and the captured image are associated with each other is provided. With reference to the timing chart 53, the user can check the status of the input and output terminals of the optical information reader 1 around the time when the trouble occurs. When there is no problem with the input and output status of the input and output terminals, a transition from the timing chart 53 to a screen where the captured image is checked can be made. On the screen where the captured image is checked, success or failure is displayed for each trigger. When each trigger is selected, a plurality of still images captured in response to the trigger can be switchably displayed. Further, instead of such a still image, a moving image may be displayed.

Figure 14:
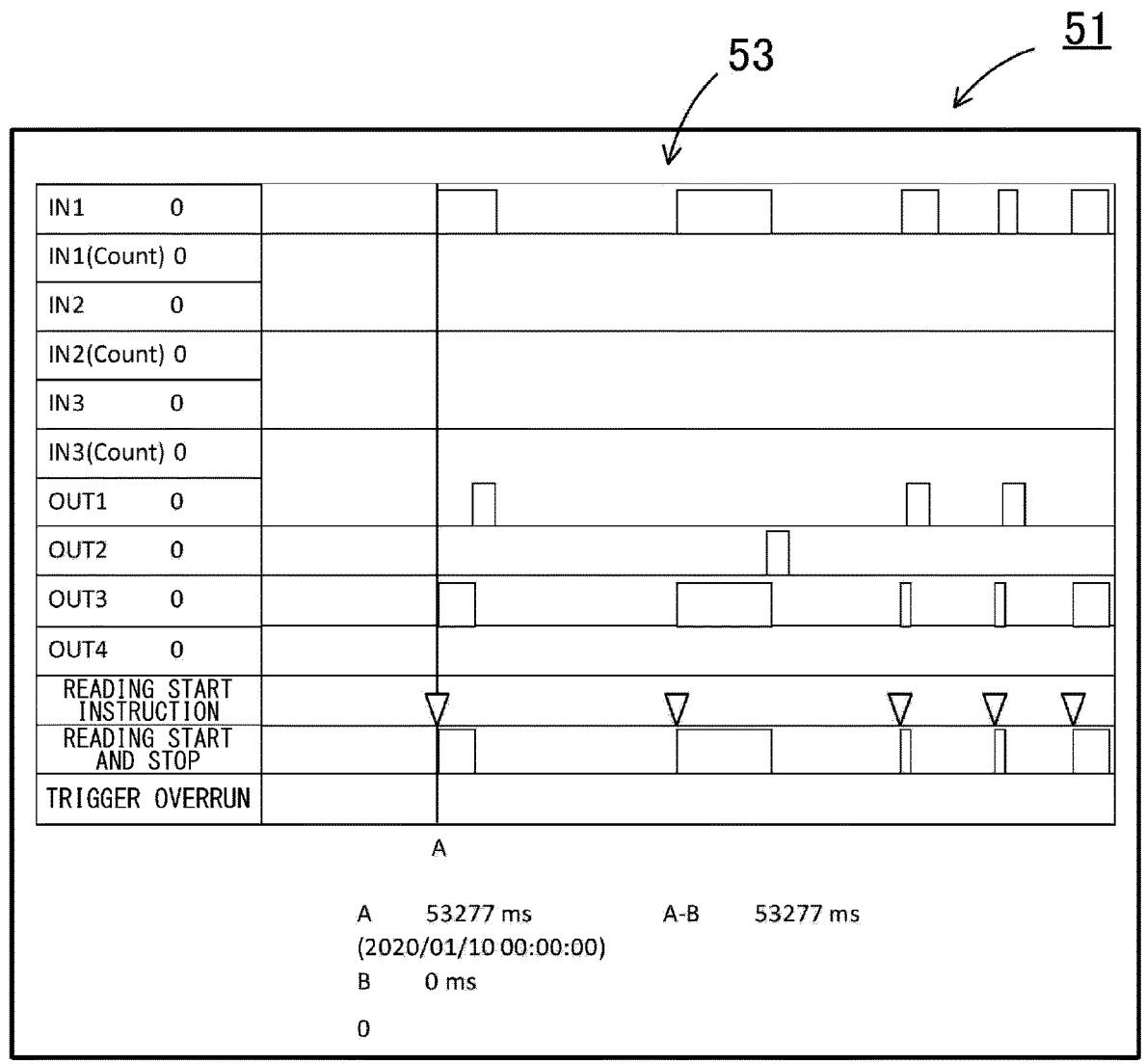
FIG. 14 is a schematic diagram showing an example of a first screen.
Figure 15:
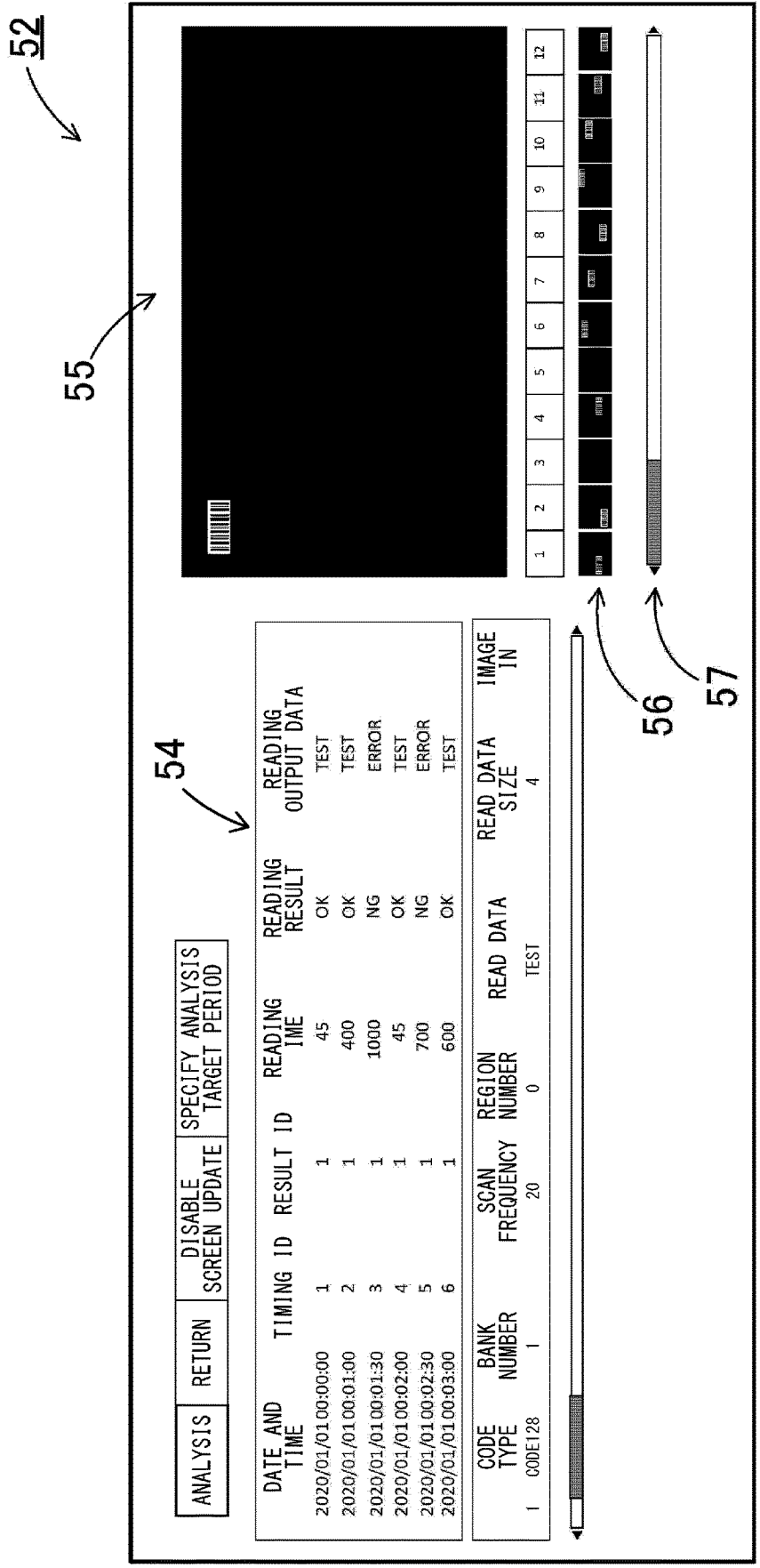
FIG. 15 is a schematic diagram showing an example of a second screen.

FIGS. 14 and 15 show examples of such display screens. FIG. 14 shows an example of the first screen 51 where the timing chart 53 is displayed, and FIG. 15 shows the second screen 52 where success or failure information on code reading and an image collected from the optical information reader 1 are displayed. As shown in FIG. 13, as the internal information on the optical information reader 1, information on input timing when the trigger signal for code reading is received is recorded as IN1, IN2, IN3, and the like. This makes it possible to check, on the timing chart 53, at which timing each trigger signal is received. Further, the success or failure information on whether reading in response to the trigger results in success or failure, that is, whether the reading process results in success or failure, is also recorded as OUT1, OUT2, OUT3, and the like. In addition, the optical information reader 1 records, therein, the reception of a reading execution instruction as "reading start instruction"

information based on the trigger signal, and further records the timing of reading start and stop as "reading start and stop".

Further, on the first screen 51, an image captured in response to the selected trigger signal may be displayed. For example, an image display field is provided at the right side or lower side of the first screen 51 to display the image associated with the selected trigger signal. When the selected trigger signal is switched to a different trigger signal, the display content in the image display field is also switched to an image associated with the different trigger signal.

When the trigger signal shown by the broken line is selected on the screen shown in FIG. 14, the success or failure information and image associated with the trigger signal are displayed on the second screen 52. That is, in the list display field 54 that is provided at the left side of the second screen 52 shown in FIG. 15 and where a list of trigger signals is displayed, a corresponding line is displayed highlighted. Further, an image captured in response to this trigger are displayed in an image display field 55 provided at the right side of the second screen 52.

(Filmstrip Display)

Further, in the image display field 55, a plurality of images may be displayed. In the example shown in FIG. 15, a thumbnail image display field 56 is provided below the image display field 55, and a plurality of images captured in response to the selected trigger signal are displayed side by side in thumbnail view. The plurality of thumbnail images displayed in the thumbnail image display field 56 are arranged and displayed side by side in chronological order, and a thumbnail image corresponding to the image currently displayed in an enlarged view in the image display field 55 is shown in a frame. Further, thumbnail images that cannot be displayed on one screen can be displayed by scrolling. In this example, the thumbnail images can be switched by operating a slide bar 57 in the horizontal direction.

Note that, in this example, a still image is displayed in the image display field 55, but, for example, a moving image may be displayed in the image display field 55. For example, sequentially switching and displaying, in chronological order, a still image to be displayed in the image display field 55 makes it possible to present a display as a pseudo moving image. Also in this case, a thumbnail image corresponding to the image currently displayed in an enlarged view in the image display field 55 is displayed in a frame shape, and the frame of the thumbnail image also changes in position in response to the switching of the images. That is, the frame moves to the left side. The state where such thumbnail images are arranged in chronological order is referred to as a filmstrip display herein.

A countermeasure is examined by using such a GUI screen in the above-described procedure shown in FIG. 13 when determining the cause of the trouble. The details of each countermeasure will be described below.

(Countermeasure 1: Read Image+Input and Output Terminal Information)

As described above, an image when code reading results in success, and internal information on the optical information reader 1 at that time (information in which OUT1 is set to ON, which is indicated by the broken line shown in FIG. 14) are recorded together. In this case, it is shown that although the optical information reader 1 succeeds in reading, the optical information reading system is stopped. This in turn shows that the cause of the trouble lies ahead of the optical information reader 1.

In light of this situation, as a possible state, (1) the reading start signal (IN1 in FIG. 14) is received as input by the optical information reader 1, but the optical information reader 1 does not respond to the reading start instruction. Therefore, possible causes of the error include that a time constant (setting that prevents a response from being made unless the ON time continues for a certain period of time or longer) is incorrect. (2) The reading start signal (IN terminal) is not received at all. Therefore, possible causes of the error include incorrect wiring (for example, it is mistakenly input into IN2). (3) The timing input waveform is clearly different from the normal one by referring to previous and following sequence states. Therefore, possible causes of the error include that an irregular process or the like is performed during transfer of an object.

(Countermeasure 2: Read Image+PLC Link, Ethernet/IP, PROFINET Map Status, and Ethernet Communication Diagnostic Information)

In the optical information reading system according to the present embodiment, data communication is performed between the optical information reader 1 and the host system such as the computer 100 or the PLC 101 usually in accordance with a communication standard such as Ethernet. Therefore, a screen where a communication status between such devices or communication diagnostic information can be checked is prepared. FIG. 16 shows an example of a GUI screen where the PLC link, Ethernet/IP, and PROFINET map status are checked. Here, a PLC map screen 120 where link communication with the PLC is checked is shown. In addition to this, the same PLC map screens can be prepared for PROFINET communication and Ethernet/IP communication.

In the optical information reading system, even when the optical information reader succeeds in reading the code, there are many cases where no data is input into the host system as causes of a trouble. In order to solve such a trouble, in the optical information reading system according to the present embodiment, it is possible to grasp whether the reading results in success by checking the image. Further, the optical information reader is capable of clearly showing what kind of flag is set during data transaction at the same time.

Thus, in the related art, it is necessary to directly connect to a host device or program to check the value of each bit, and the connection and command operation for that purpose is complicated. In the optical information reading system according to the present embodiment, it is possible to easily grasp the current situation of the optical information reader side from the output result of the optical information reader side without such a complicated operation.

(Command Monitor Screen 130)

Further, a command monitor screen 130 may be prepared so as to keep a log of commands exchanged between the optical information reader and the host system. FIG. 17 shows an example of the command monitor screen 130. As described above, recording what kind of command has been issued in the past as a history facilitates command analysis. For example, as a result of interviewing the user at the time of determining the cause of the trouble, even when the user answers that the user has not changed anything, it is possible to identify or analyze a wrong command, that is, a case where a setting command is sent from the host system instead of direct operation by the user through command log analysis.

(Ethernet Communication Diagnostic Test Function)

Figure 18:
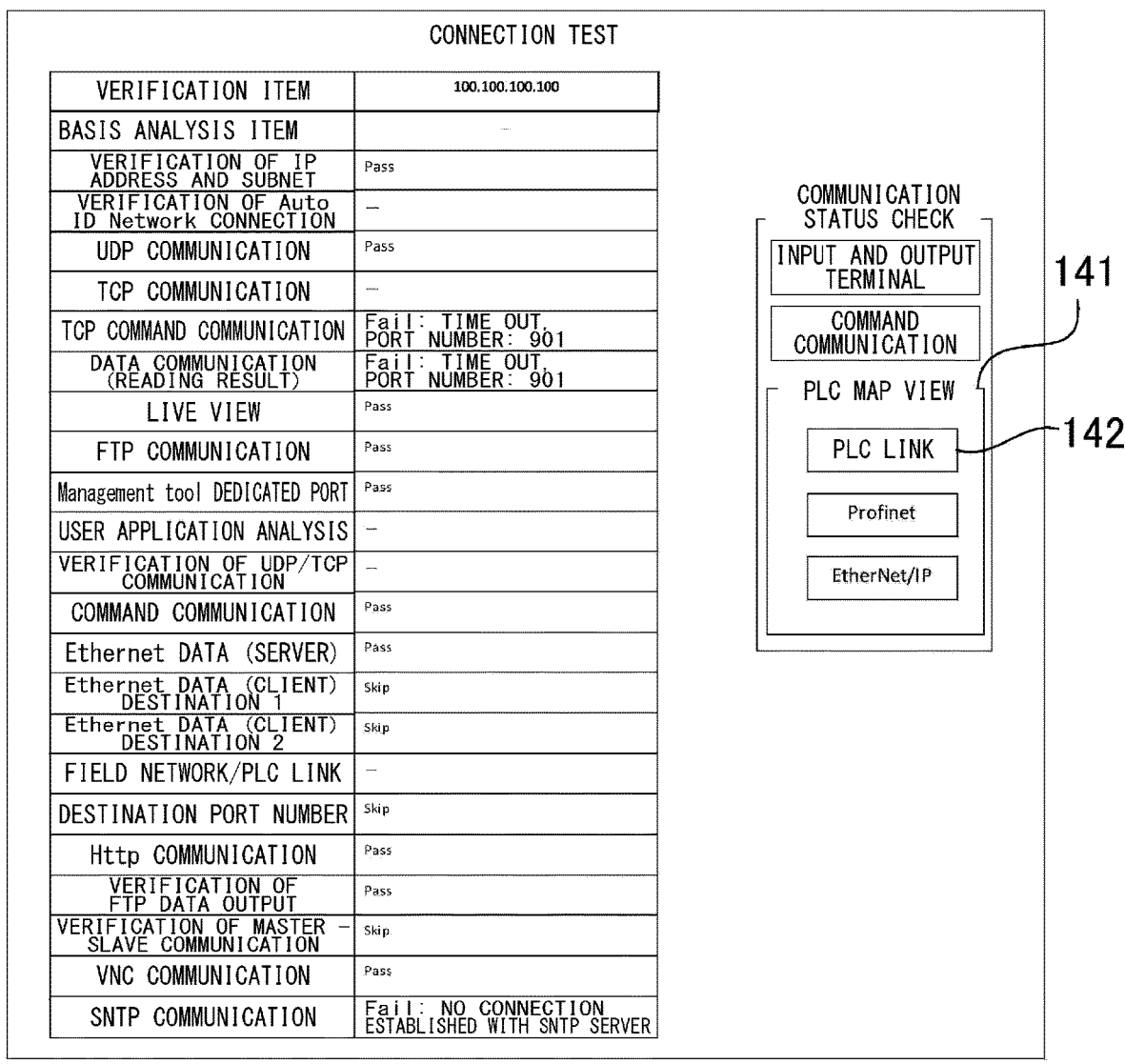
FIG. 18 is a schematic diagram showing an example of a screen where an Ethernet communication diagnostic test function is performed.

Further, the optical information reading system according to the present embodiment has an Ethernet communication diagnostic test function of automatically performing communication diagnosis related to Ethernet communication and checking for a problem with Ethernet communication itself. FIG. 18 shows an example of a communication diagnostic test screen 140 where such an Ethernet communication diagnostic test function is performed. Performing the Ethernet communication diagnostic test function makes it obvious whether various communications between the optical information reader 1 and the host system have been made. It is possible to check whether the communication function is working normally on this screen, which eliminates the need of a series of works that require knowledge about network communication, such as opening a command prompt and issuing a ping as in the related art.

The communication diagnostic test screen 140 may include a button for calling a map screen where the above-described communication status or communication diagnostic information is checked. For example, in the example shown in FIG. 18, a "PLC map display" field 141 is provided at the upper right of the communication diagnostic test screen 140, and when a "PLC link" button 142 is pressed, the PLC map screen 120 shown in FIG. 16 is displayed.

(Countermeasure 3: Filmstrip Display (Previous and Following Image Information))

Further, the optical information reading system according to the present embodiment has a filmstrip display function of checking image information before and after the trouble.

In a typical failure image, only the last read image that has been tried to be read is stored. Therefore, it is difficult to determine the cause of the trouble. For example, consider a case where the cause of the error in reading is that no transfer object is shown. Here, when only one error image is stored as in the related art, the transfer object is not shown in its entirety like a failure image NGI shown in FIG. 19, so that it is obvious that the image is a faulty image and cannot be read, but nothing is known other this. For example, the cause cannot be identified from possible causes such as that the image of the transfer object fails to be captured due to that the transfer conveyor belt is stopped and an error occurs accordingly, that the reading is finished before the arrival of the transfer object transferred by the conveyor due to a change in timing control, and that the reading is performed after the transfer object passes.

Figure 19:
FIG. 19 is an image diagram showing an example where only one error image is stored.
Figure 20:
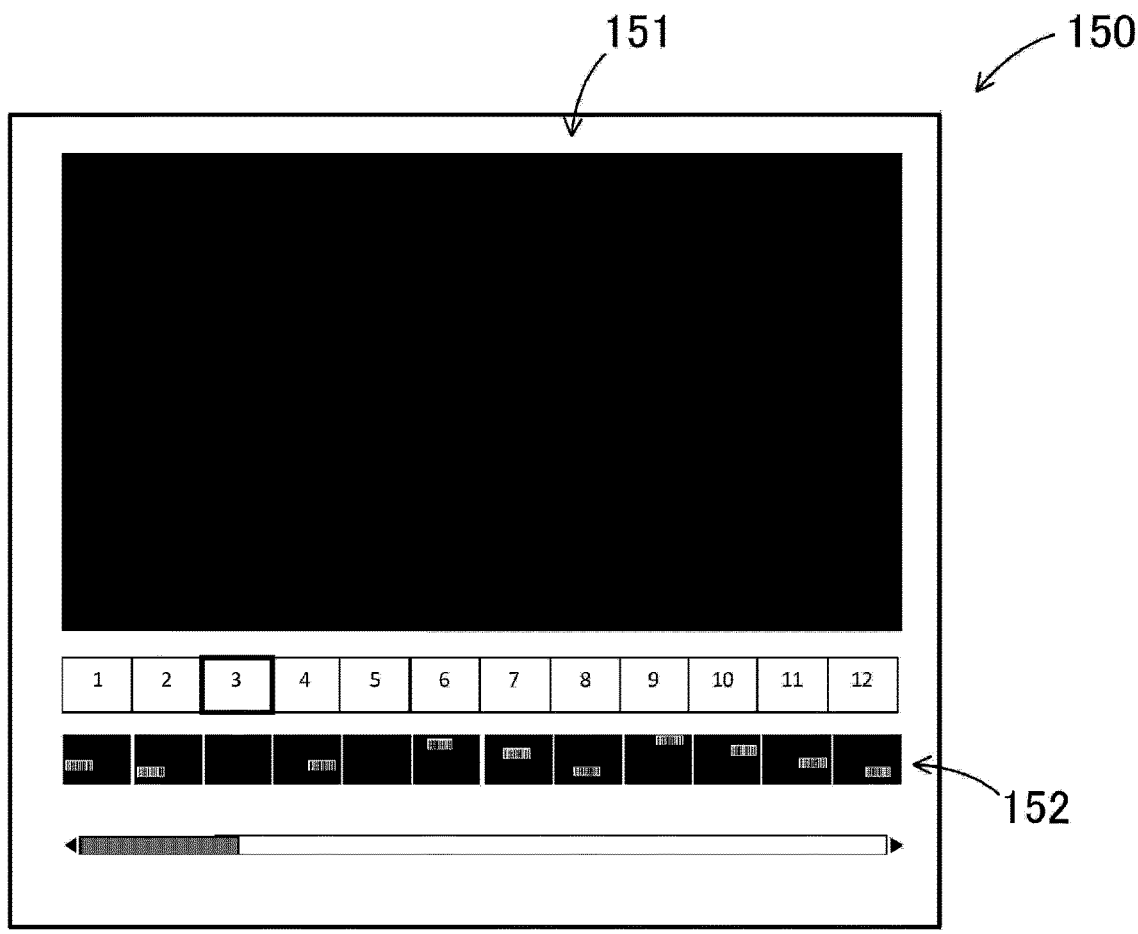
FIG. 20 is an image diagram showing an example of a filmstrip display screen.

Whereas, recording not only one failure image but also images before and after the failure image and providing a filmstrip display screen where a plurality of images are arranged in chronological order makes it possible to grasp previous and following situations, which in turn makes it possible to read various pieces of information. FIG. 20 shows an example of a filmstrip display screen 150. Here, an error image in an image display area 151 as shown in FIG. 19 is displayed together with a plurality of captured images arranged in chronological order and displayed in thumbnail view in a thumbnail image display field 152 provided at the lower side of the screen as in FIG. 15. Each thumbnail image is assigned a number, and the further to the left, the newer the image in time. Further, a thumbnail image selected in the thumbnail image display field 152 is displayed in an enlarged view at the upper side of the screen.

From such a filmstrip display screen 150, it is possible to grasp a situation when the trouble occurs by shifting a time forward and backward, which in turn makes it possible to read various pieces of information. For example, in the example shown in FIG. 20, it is shown that the conveyor is not stopped but is in operation, and therefore a situation where the conveyor is stopped is removed from possible causes. On the other hand, since it is finished before the code is read, it is presumed that the error is caused by the code reading start timing being too early or the reading end timing being too early. As described above, the filmstrip display function is used to check information on previous and following images, which contributes to the identification of the cause of the error.

(Countermeasure 4: Read Image+Read Information)

Furthermore, the optical information reading system according to the present embodiment has a function of holding not only the read image but also read information from the optical information reader 1. Specifically, the internal information on the optical information reader 1, for example, a set of parameters such as the margin when the code is read is also sent. Then, this information is continuously sent even when the reading results in success, and when the reading results in an error, it is possible to extract a difference by comparing with data when the reading results in success. This makes it possible to help presume the cause of the failure in reading.

For example, when an error occurs in reading because it is too bright or too dark, the contrast value of the code part is sent at the time of reading, and a comparison is made between the value on success and the value on failure, which is useful for identifying the cause and determining the countermeasure.

Further, when an error occurs in reading because of insufficient margin in the quiet zone, the magnification (ratio with respect to the narrow bar width) value of the quiet zone of the code is sent at the time of reading, and a comparison is made between the value on success and the value on failure, which is useful for identifying the cause and determining the countermeasure.

Alternatively, when an error occurs in reading because the number of digits is different from the number of digits of a predetermined code, the code width information is sent, and a comparison is made between the value on success and the value on failure, which is useful for identifying the cause and determining the countermeasure. The code width information can be obtained through conversion based on, for example, the coordinate positions of the four corners of the code and the size of the PPC.

Alternatively, when an error occurs in reading because of a different code type, only a specified code type is to be read during operation, but during error verification other than operation time, the code image that results in an error in reading is read again without any restriction on the code type, and the result is notified.

The optical information reader, optical information reading method, optical information reading program, non-transitory computer-readable recording medium, and recording device according to the present invention are suitably applicable to stationary code readers, portable scanners, portable terminals, commercial PDAs, and the like that are used in warehouses, factories, stores, hospitals, and the like and are configured to read symbols such as barcodes or two-dimensional codes to register and collate data.

What is claimed is:

1. An optical information reading system comprising:
   an optical information reader configured to read a code attached to an object to be scanned;
   a display part; and
   a management device connected to the optical information reader and the display part and configured to cause the display part to display information on the optical information reader, wherein the optical information reader includes:
- a trigger input part configured to receive a trigger signal from outside;
- a decoder configured to perform a reading process on the code;
- an imaging part disposed to be able to read the code and configured to capture, each time the trigger input part receives the trigger signal, a plurality of images at predetermined timing until the decoder succeeds in reading the code or the reading process times out; and
- an output part configured to output, to the management device, information on timing at which the optical information reader receives the trigger signal, success or failure information on code reading, and the plurality of images captured by the imaging part, wherein:

the success or failure information representing whether the reading process performed by the decoder results in success or failure and the plurality of images captured in response to the trigger signal are associated with the trigger signal, and when the management device selects a reading result corresponding to any trigger signal, at least one of the plurality of images associated with the trigger signal selected is allowed to be displayed with a list of reading results corresponding to a plurality of trigger signals on the display part.

2. The optical information reading system according to claim 1, wherein
the management device further includes, in the display part, a display controller configured to cause the display part to simultaneously or switchably display
- a first screen configured to display a timing chart in which a plurality of pieces of the information on timing collected from the optical information reader are displayed on a common time axis; and
- a second screen configured to display both the success or failure information on code reading and an image collected from the optical information reader.

3. The optical information reading system according to claim 2, wherein
the management device further includes a trigger selection part configured to select, with the timing chart displayed on the first screen of the display part, a reading result corresponding to any trigger signal on the timing chart, and
when the trigger selection part selects a reading result corresponding to any trigger signal, at least one of the plurality of images associated with the trigger signal is displayed on the display part.

4. The optical information reading system according to claim 1, wherein
a jump from the first screen displayed on the display part to the second screen is allowed.

5. The optical information reading system according to claim 1, wherein
an image displayed on the display part is a moving image.

6. The optical information reading system according to claim 1, wherein
the optical information reader causes, when the decoder performs the reading process on the code, the output part to output information containing status information on the optical information reader, and
the management device associates the trigger signal with the status information and causes the display part to display the trigger signal and the status information.

7. The optical information reading system according to claim 1, wherein
the success or failure information on code reading representing failure in reading associated with the trigger signal is extracted and displayed on the display part.

8. The optical information reading system according to claim 1, wherein
the object to be scanned is a transfer object that moves on a transfer line.

9. An optical information reader configured to read a code attached to an object to be scanned, the optical information reader comprising:
- a trigger input part configured to receive a trigger signal from outside;
- a decoder configured to perform a reading process on the code;
- an imaging part disposed to be able to read the code and configured to capture, each time the trigger input part receives the trigger signal from outside, a plurality of images at predetermined timing until the decoder succeeds in reading the code or the reading process times out; and
- an output part configured to output, to an external management device, information on timing at which the optical information reader receives the trigger signal, success or failure information on code reading, and the plurality of images captured by the imaging part, wherein
the success or failure information representing whether the reading process performed by the decoder results in success or failure and the plurality of images captured in response to the trigger signal are associated with the trigger signal and are allowed to be displayed on an external display part.

10. An error cause analysis method for analyzing a cause when an error occurs in an optical information reading system including an optical information reader configured to read a code attached to an object to be scanned, a display part, and a management device connected to the optical information reader and the display part and configured to cause the display part to display information on the optical information reader, the error cause analysis method comprising:
- causing the optical information reader to receive a trigger signal from outside;
- capturing, each time the trigger signal is received, a plurality of images at predetermined timing until a decoder performs a reading process on the code, and the decoder succeeds in reading the code or the reading process times out;
- outputting, to the management device, information on timing at which the optical information reader receives the trigger signal, success or failure information on code reading, and the plurality of images captured by the imaging part;
- causing the management device to record the success or failure information representing whether the reading process performed by the decoder results in success or failure and the plurality of images captured in response to the trigger signal with the success or failure information and the plurality of images associated with the trigger signal input from the optical information reader;
- selecting, with a list of reading results corresponding to a plurality of the trigger signals displayed on the display part, a reading result corresponding to any trigger signal; and causing the display part to display at least one of a plurality of images associated with the trigger signal selected.

11. The error cause analysis method according to claim 10, further comprising identifying, with an image displayed on the display part, the cause of the error that occurs in the optical information reading system from a trouble related to data input and output between an external device and the optical information reader, a trouble related to data communication between the external device and the optical information reader, and a trouble related to code reading by the optical information reader.

* * * * *